United States Patent [19]

Uno et al.

[11] 3,887,762

[45] June 3, 1975

[54] INSPECTION EQUIPMENT FOR DETECTING AND EXTRACTING SMALL PORTION INCLUDED IN PATTERN

[75] Inventors: Takeshi Uno, Sayama; Haruo Yoda, Hachioji; Masakazu Ejiri, Tokorosawa; Michihiro Mese, Kokubunji; Sadahiro Ikeda, Tachikawa, all of Japan

[73] Assignee: Hitachi, Ltd., Japan

[22] Filed: Nov. 20, 1972

[21] Appl. No.: 307,870

[30] Foreign Application Priority Data

July 8, 1972 Japan ................................ 47-75069

[52] U.S. Cl. ...... 178/6; 178/DIG. 12; 178/DIG. 34; 178/DIG. 37; 235/92 PC

[51] Int. Cl. ............................................ H04n 1/38

[58] Field of Search ....... 235/92 PC; 355/77; 95/85; 178/DIG. 37, DIG. 3, 6, DIG. 34, DIG. 12, 6.8; 340/347 AD, 146.3 AG

[56] References Cited

UNITED STATES PATENTS

| | | | |
|---|---|---|---|
| 3,277,286 | 10/1966 | Preston | 235/92 PC |
| 3,508,826 | 4/1970 | Grabau | 95/85 |
| 3,521,241 | 7/1970 | Rumble | 178/DIG. 3 |
| 3,624,606 | 11/1971 | Le Fevre | 340/146.3 AG |
| 3,653,014 | 3/1972 | List | 178/DIG. 3 |
| 3,700,797 | 10/1972 | Wernikoff | 178/DIG. 3 |
| 3,746,784 | 7/1973 | Oosterhout | 178/6.8 |
| 3,763,357 | 10/1973 | Morton | 235/92 PC |

*Primary Examiner*—Howard W. Britton
*Assistant Examiner*—Michael A. Masinick
*Attorney, Agent, or Firm*—Craig & Antonelli

[57] ABSTRACT

Inspection equipment is provided which may easily detect and extract bad spots or defects included in a pattern such as an IC or printed circuit. The inspection equipment comprises a video input device for deriving the video information of a pattern to be inspected, a device for converting the output signal of the video input device into a binary video signal and sampling the binary video signal, a two-dimension buffer memory for converting the output of the A-D converter and sampling device into a two-dimensionally arranged signal, and a processing device for extracting the bad spots in the pattern from the output of the two-dimensional image extracting device. The output of the inspection equipment may be delivered to a TV display.

18 Claims, 51 Drawing Figures

| | | | | | | | | | | | | | | | |
|---|---|---|---|---|---|---|---|---|---|---|---|---|---|---|---|
| FIG. 34A | 0 | 0 | 0 | 1 | 0 | 0 | 0 | 1 | 1 | 1 | 0 | 1 | 1 | 1 | 1 |
| FIG. 34B | 0 | 0 | 1 | 0 | 0 | 0 | 1 | 1 | 1 | 0 | 1 | 1 | 1 | 1 | 1 |
| FIG. 34C | 0 | 0 | 0 | 0 | 1 | 0 | 0 | 0 | 1 | 1 | 1 | 0 | 1 | 1 | 1 |
| FIG. 34D | 0 | 0 | 1 | 1 | 1 | 0 | 1 | 2 | 3 | 2 | 2 | 2 | 3 | 3 | 3 |
| FIG. 34E | 0 | 0 | 0 | 0 | 0 | 0 | 0 | 1 | 1 | 1 | 1 | 1 | 1 | 1 | 1 |

INSPECTION EQUIPMENT FOR DETECTING AND EXTRACTING SMALL PORTION INCLUDED IN PATTERN

BACKGROUND OF THE INVENTION

1. Field of the Invention

The present invention relates to inspection equipment for extracting bad spots or defects included in a complex pattern from video information.

2. Description of the Prior Art

Components having complex patterns, such as printed circuits or IC pellets, have been inspected visually by inspectors, but since the bad spots are generally included in the complex patterns and are very small in size, they pass undetected very often, and the inspection time is considerably lengthy even when carried out by a skilled inspector. Furthermore, the fatigue of the eyes of an inspector is considerably increased when the visual inspection is continued for a long time. In order to improve productivity and to save labor cost, there has been devised and demonstrated automated inspection equipment capable of detecting the defects included in a simple pattern in a plain background such as paper, glass, steel or the like, but so far no automated inspection equipment especially adapted for detecting bad spots or micro-defects included in a complex pattern such as a printed circuit or IC pellets has been proposed. There has long been a need for automated inspection equipment of the type using video information.

There has been proposed an inspection method in which a reference image which does not include any defect and consists of the areas or elements in two states, such as bright and dark areas, is optically registered with an image of a part to be inspected which includes bad spots or defects, so that the latter may be extracted. The reference image must be registered with the image of a part to be inspected with a higher degree of accuracy. For this purpose, a reference or standard object and a part to be inspected are securely held in the correct position, and the reference object is illuminated with red light whereas the part to be inspected is illuminated with green light, so that an inspector may see the images through a semi-transparent mirror. When the original perfectly coincides with the part to be inspected, the dark area becomes black whereas the bright area becomes white because red and green light are synthesized. However a bright bad spot included in the dark area becomes green whereas a dark bad spot included in the bright area becomes red so that the bad spots or defects may be easily detected. But this method has the disadvantage that the registration of the image of the reference object with the image of a part to be inspected must be made with an extremely high degree of accuracy so that this method may be carried out only by a skilled inspector. When there is a misalignment between the two images, the misaligned portion becomes green or red so that they are mistakingly detected as defects. Therefore, this method is not adapted for the automated inspection equipment.

SUMMARY OF THE INVENTION

One of the objects of the present invention is, therefore, to provide automated inspection equipment which may easily detect and extract any micro-defect or bad spot included in a complex pattern.

Another object of the present invention is to provide an analog-to-digital converter which may convert analog information of a part to be inspected into binary signals with a high degree of accuracy.

Another object of the present invention is to provide an inexpensive two-dimensional image extracting device which may rearrange, at a high speed, a one-dimensionally arranged pattern of a part to be inspected into two-dimensionally arranged information.

Briefly stated, inspection equipment in accordance with the present invention comprises a video input device for deriving video information of a part to be inspected, a device for converting the video information into binary signals and sampling the binary signals, a two-dimentional image extracting device for converting the output of said second mentioned device into two-dimensional arranged signals, and a processing device for extracting a bad spot or defect in the pattern to be inspected from the output of the two-dimension buffer memory. The output of the inspection equipment, in accordance with the present invention, may be displayed by a suitable display device, so that any micro-defect or bad spot in a part to be inspected may be easily detected and extracted.

BRIEF DESCRIPTION OF THE DRAWING

FIG. 39 is a diagram of a micro-spot extracting device based upon the small portion extracting method. extracting First, the underlying principle of the present invention will be described. The inspection equipment, in accordance with the present invention, is for inspecting a multi-dimensional pattern consisting of two conditions (ON and OFF) or (light and dark) which will be referred to as "the binary states" hereinafter in this specification. Therefore, the patterns may be a one dimensional pattern such as a telegraph code, a two-dimensional pattern which may be a visible pattern consisting of white and black areas, a three-dimensional pattern and so on.

In the description of the preferred embodiments of the present invention, a two-dimensional pattern is used, but it will be understood that the present invention is not limited thereto and uses any multi-dimensional pattern.

A two-dimensional binary pattern is, for example, a black character or the like printed on white paper, but it will be understood that the two-dimensional binary pattern is not limited to such a pattern described above consisting of the binary conditions in the strictest sense of the word. For example, the binary information may be derived from a multi-color poster by using an optical filter, and even an object having a complex profile and surface pattern may be handled as a two-dimensional binary image when the object is illuminated with a suitable background. In the latter case, a binary conversion circuit to be described in detail hereinafter is not necessarily required.

For a two-dimensional multi-level pattern in which the tone is varied step-wise or continuously, in order to provide contrast, the pattern may be converted into a two-dimensional pattern by a suitable threshold processing method.

The inspection equipment of the present invention handles the two-dimensional patterns of the type described above.

Figure 1:
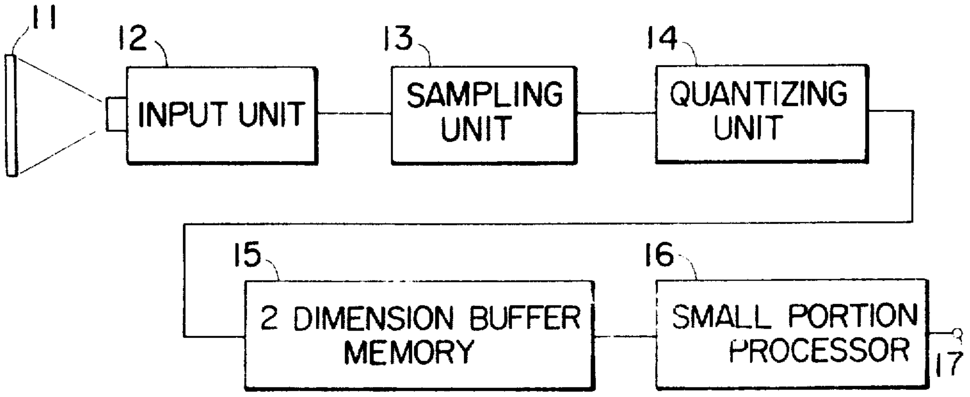
FIG. 1 is a block diagram of inspection equipment in accordance with the present invention.

Next, referring to FIG. 1 illustrating the fundamental arrangement of the present invention, a component part 11 to be inspected is scanned by a video input device 12 such as a TV camera and, if necessary an optical filter may be interposed between them. The video signal output from the video input device 12 is sampled by a sampling circuit 13 which may be of the type of dividing the scanning signals of the TV camera 13 by a predetermined time interval. The output signal of the sampling circuit 13 of the level of which varies depending upon the part 11 to be inspected is converted into binary signals representing the light and dark areas of the part 11 by a quantizing circuit or A-D converter 14. In the instant embodiment, the output signal of the video input device 12 is first sampled and then converted into binary signals, but it will be understood that the video output signal may be first converted into the binary signals and then sampled. The quantizing circuit 14 may be an analog comparator or an A-D converter whose multi-level output signals may be converted into binary signals by a suitable threshold level discriminating means. The present invention uses a fixed threshold method and a floating threshold method as will be described in detail hereinafter. The output of the quantizing circuit 14 is applied to a small portion processing device 16. The small portion processing device 16 may be an electronic computer, but in accordance with the present invention, instead of such an expensive computer, specially designed hardware adapted to accomplish (1) a boundary space method, (2) an enlargement-reduction method, (3) a periphery averaging method, and (4) a small portion extracting method, all of which will be described in detail hereinafter, are used. But it will be understood that the present invention is not limited to the above four methods. An alarm device or a color television receiver is coupled as an output display device to an output terminal 17.

In extracting the small portion of a multi-dimensional pattern, there may be used a simultaneous or parallel processing method and a sequential or serial processing method. The former has an advantage in that the processing time is very fast but a disadvantage that the number of component parts is considerably increased, thus resulting in a high cost. The processing time by the sequential or serial processing method is not so much faster than that of the simultaneous or parallel processing method, and is of the order of 10 ms per picture or frame so that there arise no serious problem in practice. Sequential processing is accomplished by a two-dimension buffer memory 15 shown in FIG. 1. The components of the device shown in FIG. 1 will be described in more detail hereinafter.

QUANTIZING CIRCUIT (A-D CONVERTER)

The continuous video signal from an ITV camera is zero-clamped by a DC regenerting circuit (the black level being set to 0 V) and then converted into binary signals by a fixed or floating threshold method.

The fixed threshold method is the simplest and a widely used method. That is, the optical image of the part to be inspected is converted into continuous electrical signals by a scanning type photoelectric converter in the ITV camera, and then converted into the binary signals by using a predetermined threshold level. The threshold level may be, for example, fixed to an intermediate level between the white and black levels of the image, but this has the disadvantage that only a bad spot which is large in size may be detected but an extremely small bad spot cannot be extracted due to the limited resolution power of the photoelectric converter used.

Figure 2:
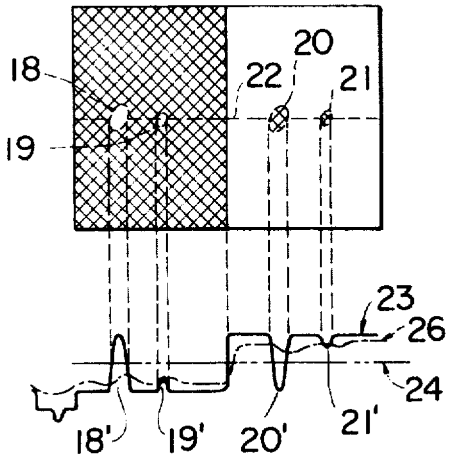
FIGS. 2, 3 and 4 show the dark and bright patterns to be inspected.
Figure 3:
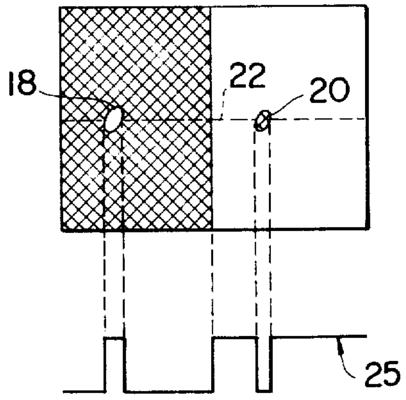

FIG. 2 shows the pattern of a part to be inspected which includes bad spots. When the part to be inspected is an IC mask, the dark area represents, for example, chromium deposited upon a transparent glass plate. The bad spots in the dark area are indicated at 18 and 19 whereas those in the bright area are indicated at 20 and 21. The video signal 23 is derived along the scanning line 22 passing through these bad spots. The bad spots appear in the video signal at 18', 19', 20' and 21', respectively. A threshold level 24 is fixed at the midpoint between the white and black levels. When the bad spots 19 and 21 are too small compared with the diameter of the electron beam, the levels of the signals 19' and 21' representing the bad spots 19 and 21 do not reach the threshold level 24. Therefore, the binary signals 25 as shown in FIG. 3 are derived, and it is seen that the bad spots 19 and 21 in FIG. 2 are not detected at all.

Figure 4:
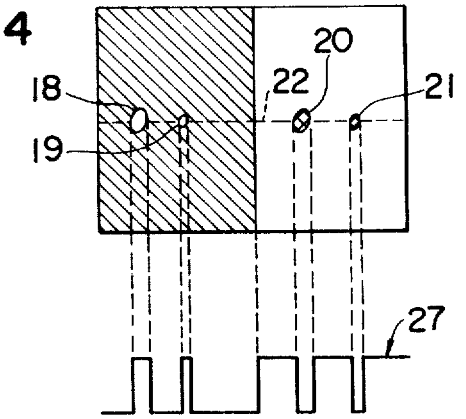

In the floating threshold method, the threshold level is varied depending upon the dark and bright levels of an image, so that the bad spots 19 and 20 which are extremely small in size may be detected. For example, as shown in FIG. 2, a variable threshold level 26 is lowered when the level of the video signal level is low, but is raised when the latter is high. The center level of the floating threshold level 26 coincides with the fixed threshold level 24 and is slightly smaller than the level of the video signal 23. The signal representing the bad spot goes to the direction opposite in polarity to that of the signal representing the background, the floating threshold level must be varied sufficiently slowly with respect to the reversal in polarity of the video signal 23. Thus the binary signals 27 as shown in FIG. 4 may be derived. It is seen that the video output signal is very fast to respond to the reversal in brightness of the image at the bad spots and the boundary between the dark and bright areas. It is preferable that the level of the floating threshold 24 is as high as possible so far as it will not reach the noise levels in both the bright and dark levels. The floating threshold level is formed from the video signal, but when the response time is too long, the signal representing a bad spot will not coincide with the actual bad spot, but when the response time is too short the resolution power is deteriorated. Therefore, there must be a compromise between the response and the resolution power depending upon the image and hence a part to be inspected.

Figure 5:
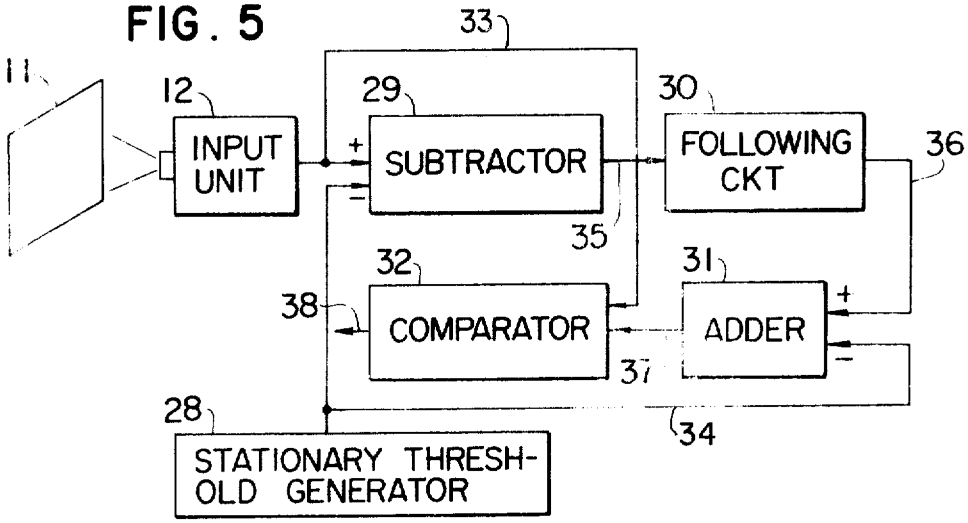
FIG. 5 is a block diagram of inspection equipment similar to that shown in FIG. 1, except that it incorporates a floating threshold type analog-to-digital converter.

FIG. 5 is a block diagram of a bad spot inspection equipment shown in FIG. 1 and provided with the floating threshold type binary converter of the type described. The object 11, such as a printed circuit or an IC mask, is scanned by the ITV camera 12. A stationary threshold generator 28 gives a fixed thereshold level depending upon the bright and dark levels of an image. Reference numeral 33 denotes the output signal of the ITV camera 12;34, the output of the stationary threshold generator 28;29, a subtractor for substracting the output signal 34 from the output signal 33 so that the center level of the threshold level may be maintained almost at 0;35, the output of the subtractor 29; and 30, a circuit whose gain is slightly smaller than unit 1 with respect to the signal 35 and which slowly trails the input signal. In practice, the circuits 29 and 30 are operational amplifiers one of which is a so-called linear delay line having a resistor and a capacitor inserted in the feedback loop and the other of which is an inverter with a gain less than unity for inverting the polarity. An adder 31 is adapted to add the output signal 36 from the circuit 30 to the output signal 34 from the stationary threshold generator 28, so that the average level of the signal 36 may coincide with that of the video signal 33. The output signal 37 of the adder 31 is the floating threshold level 26 (see FIG. 2). A comparator 32 compares the two input signals 33 and 37 and gives 1 or 0 depending upon the difference therebetween. The output signal 38 of the comparator 32 corresponds to the signal 27 shown in FIG. 4, that is, the binary signal.

In the fixed threshold level generator 28, a constant voltage from a constant voltage source may be divided by a variable resistor, and other circuits 29, 30, 31 and 32 may comprise simple operational amplifiers.

In the instant embodiment, the photoelectric converter 12 has been described as an ITV for scanning the part 11 to be inspected, so that video signals are sequentially derived, but the floating threshold level system in accordance with the present invention may be also applied to a system in which a two-dimensional information is simultaneously processed by using the photoelectric converter 12 of the type capable of storing the focused image such as an array of photoelectric cells and the memory 28 of the type capable of storing an image which has a uniform brightness over the whole area thereof and whose center level, that is, the spatial average, is fixed. The memory 28 may be, for example, an array type frame memory. Alternatively, the memory may be a lens system capable of storing an image which is transmitted through a low-pass filter of the type capable of interrupting the spatial variation from the input image. Instead of the subtractor 29, for example, an array type operational amplifier group may be used for shifting the brightness of an image by subtracting the average brightness thereof. The circuit 30 is a filtering device such as a low-pass filter capable of compensating for fuzziness. The device 31 is an image adder and the device 32 is an image comparator. Therefore, the threshold 37 of the image becomes two-dimensional information in the form of a gentle waveform, and the steep image portion in excess of this threshold level is extracted.

In the case of an electrocardiogram and electroencephalography which handle very weak electrical signals, the drift in the detectors presents a serious problem, but in the floating threshold system in accordance with the present invention the threshold level is varied in response to the slow drift, so that the problem of drift is not serious when the signals are converted into binary signals. Therefore, even a very small spike which represents a bad spot may be easily detected.

Another advantage of the floating threshold system in accordance with the present invention, when applied to a pattern recognition device, is that the shading of a TV camera or the like will not present a problem. That is, when the threshold level 24 is low, in order to detect the bad spot 19' in FIG. 2, the black level is generally curved because of the nonuniform sensitivity of the image. If the conventional fixed threshold system is used, the signal representing the normal black level other than a bad spot tends to exceed the threshold level, thereby mistakingly representing the white level. However, when the floating threshold system in accordance with the present invention is used, erratic binary conversion due to the nonuniform sensitivity such as shading may be prevented as far as the white and black levels of the video signal will not be overlapped, that is, as far as they vary within the range outside of the center level.

TWO-DIMENSION BUFFER MEMORY

This is a device for converting the two-dimensionally arranged information, such as the video, magnetic or mechanical information (which will be referred to as "the pattern information" in this specification hereinafter) into information of one dimension in time by scanning and then rearranging it into two-dimensional pattern information.

In the visual information processing system, the image of an object obtained by a video input device such as a television camera is, in general, converted into signals representing the intensities of picture elements of the image.

The conventional information processing of the type described has been generally accomplished by a digital computer. A tremendous amount of video information is stored on a core or drum memory, and each bit of information is processed in order to derive the characteristic of the of the object. For example, when a picture frame is divided by 240 lines in the longitudinal direction and by 320 lines in the lateral direction, there are formed 76,800 picture elements. If six bits are used to represent the bright and dark picture elements, a considerably large capacity memory capable of storing 461 kilo bits is required. Furthermore, each picture element must be processed. If it takes 100 micro seconds to process each picture element, it would take about 7.7 sec. to process all of the picture elements. That the information stored in the memory is large and the processing time is longer means that a large capacity electronic computer must be used for a considerably long time. Thus, the cost of the inspection equipment becomes tremendously high.

According to the present invention, as opposed to the conventional system in which the video data are once stored in a memory and then processed, the pattern information is immediately processed as soon as it is received. Therefore, the present invention has an advantage that the pattern information may be processed at a speed equal to the input speed.

So far, there has not been proposed an input device which is capable of simultaneously receiving all of the two-dimensional information. In general, the video signals are derived, for example, by scanning by a television camera an object. In the two-dimension buffer memory, in accordance with the present invention, two-dimensional space is converted by scanning into one-dimensional time information which is converted into two-dimensional information by use of a few memories, so that the video information may be processed in a manner best adapted for attaining the objects of the present invention.

Figures 6, 7:
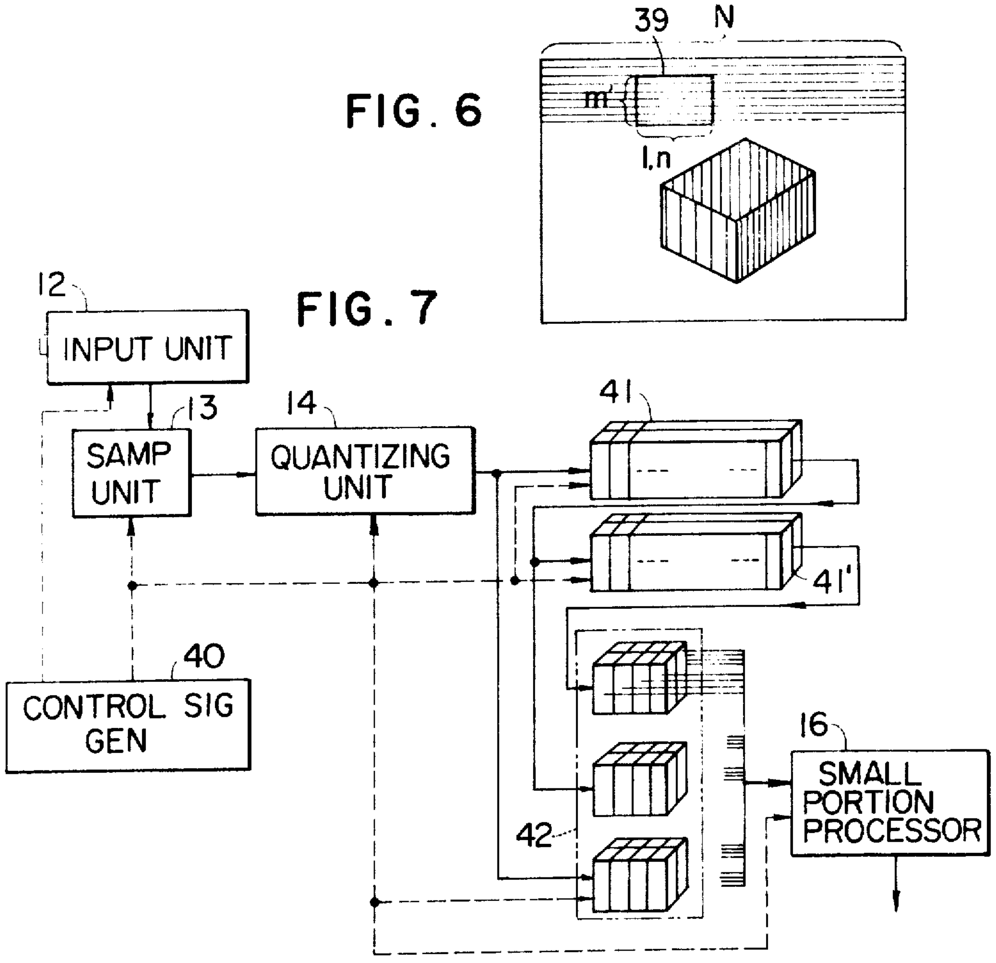
FIG. 6 shows one example of an image of a pattern to be inspected.
FIG. 7 is a block diagram of inspection equipment similar to that shown in FIG. 1 except that it includes a two-dimensional image extracting device.

With video information processing it is often desired to remove the noise from an image of the type shown in FIG. 6. For this purpose, there has been proposed a very simple method for removing the noise from the signals obtained by scanning by using a time filter. However, this is a one-dimensional system so that the components orthogonal to the scanning lines are not taken into consideration. In order to process two-dimensional information, the information obtained by the previous scannings must be stored so that the orthogonal components may be also processed. In practice, at least, the information encircled by 39 in FIG. 6 is preferred to be stored in the processing equipment. The simplest technical solution is to store all of the information of the image, so that the required information encircled at 39 may be used at any time. This is accomplished by a digital computer in the manner described hereinbefore, but a tremenendous number of storage elements are required and a considerable time is required for writing and reading, so that the processingi equipment becomes complex in construction and expensive. However, according to the present invention, only the information encircled by the lines 39 in FIG. 6 is stored and processed, so that the number of storage elements may be reduced. Furthermore, the information is processed as soon as the video information obtained by scanning is received, so that the processing time may be considerably reduced. Thus, the device in accordance with the present invention may be designed to be simple in construction and may process the two-dimensional information at a very high speed.

When the encircled information 39 has $m$ scanning lines each having a length $l$, the information corresponding to $m\ x\ l$ is to be processed. If the $m \times l$ portion has a storage function, the storage capacity is such that only the information on $(m - l)$ scanning lines may be stored, not on the $m$ scanning lines. The equipment would be very complex in construction and expensive if the storage elements used for storing the information along the scanning line $l$ are such that the continuously changing brightness information may be stored. Therefore, one of the practical methods is to divide a scanning line at a suitable interval depending upon the spacing between the adjacent scanning lines (in practice the scanning line $l$ being sampled in time) and to quantize the sampled information for storage. If the scanning line $l$ is divided into $n$ segments and a number of $k$ bits is used for quantization, the storage capacity for storing the information 39 will become $m \times n \times k$ bits. The quantized information may be stored by registers, delay lines or shift registers using bubble memories. Continuous information may be stored in an analog disc, so that the sampling and quantization are not necessarily required.

FIG. 7 shows one embodiment of the present invention in which $m = 3$, $n = 4$ and $k = 2$. An image input device such as a vidicon 12 is used, in order to convert the optical image into the electrical signals. A control signal generator 40 generates the sync signals and scanning signals for the image input device 12 and for sampling circuit 13. In response to the scanning signal the video input device 12 effects horizontal scanning in a manner well known in the art, so that the two-dimensional dark and bright image may be converted into one-dimensional electric information representing dark and bright information.

The electric information is sampled by the sampling circuit 13 in response to the control signal which is applied from the control signal generator 40 and is synchronized with the scanning signal. Therefore, the bits. scanning line $l$ is divided into $n$ segments. A quantization circuit such as an A-D converter 14 converts the analog electrical information into digital information in response to the syncsignal applied from the control signal generator 40 in synchronism with the sampling period. The digital information derived from the quantization circuit consists of $k$ bits Shift registers 41 and 41' are adapted to store the quantized information on each scanning line and shift their contents toward their outputs in response to the sync signal applied from the control signal generator 40 in synchronism with the sampling frequency. Each shift register comprises $n \times k$ bit memory elements, and each output signal consisting of k bits is applied from the register 41 to the register 41'.

A shift register 42 consisting of $m \times n \times k$ bit memory elements stores the encircled information 39, and any bit may be written into and read out from the shift register 42. The output of the quantization circuit 14 is applied to the input terminals ($k$ terminals) of the lowermost stage of the shift register 42; the output of the shift register 41 to the input terminals of the middle stage; and the output of the shift register 41' to the input terminals of the uppermost stage. All of the above outputs are applied in response to the sync signal from the control signal generator 40 in synchronism with the sampling frequency. Furthermore, in response to the sync signal, the $k$-bit signal in each stage is shifted to right. The bit information stored in the shift register 42 is applied to a processing circuit 16 for processing the bit information. The output of the processing circuit 16 may be applied to another device or may be written into the shift register 42. The information processsing by the processing circuit 16 is also effected in response to the sync signal applied from the control signal generator 40.

The image is scanned from left to right as in the case of the scanning used in the television so that when the right bottom corner of the encircled information 39 is scanned, all of the information 39 is stored in the shift register 42. The processing circuit 16 which processes the information stored in the shift register 42 is coupled to other circuits depending upon the objects of the data processing, but this is not within the scope of the present invention.

As the scanning and sampling operations proceed, the contents in the shift registers 41, 41' and 42 are shifted. That is, the information corresponding to one shift is stored into the shift register 42, and the output entirely different from the above information is derived from the processing circuit 16. As the image is scanned, the processed information is derived from the processing circuit 16, so that when the output of the processing circuit 16 is arranged in response to the scanning signal from the control signal generator 40, the processed image may be obtained.

Figure 8:
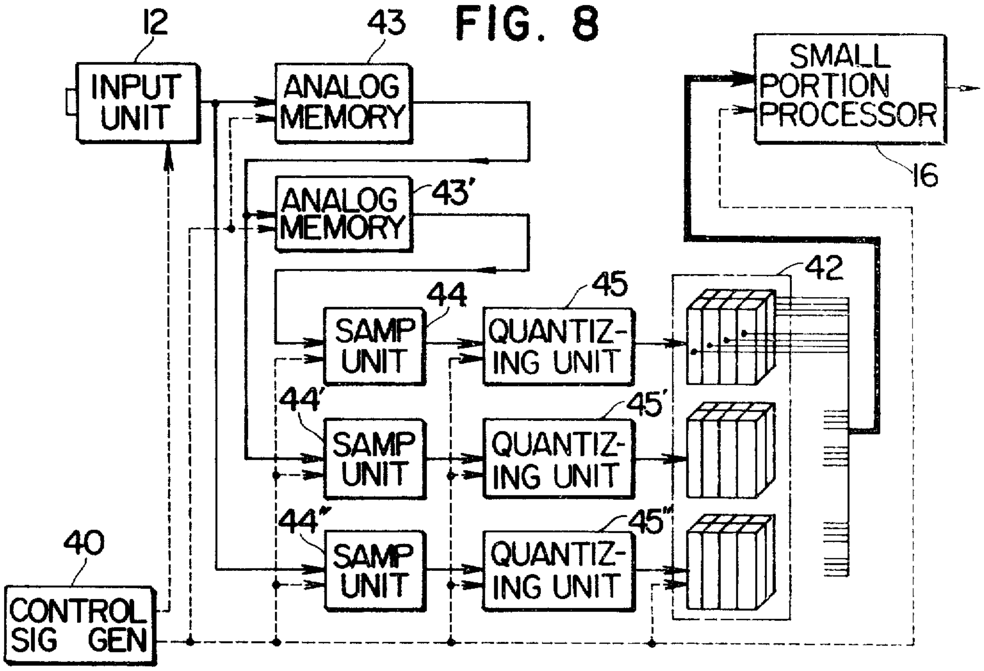
FIG. 8 is a block diagram of inspection equipment similar to that shown in FIG. 7 except that a variation of the two-dimensional image extracting device is incorporated therein.

In another embodiment of the present invention shown in FIG. 8, instead of the shift registers 41 and 41' shown in FIG. 7, delay lines or analog discs 43 and 43' are used in order to store the analog signals and instead of the sampling circuit 13 in FIG. 7 sampling circuits 44, 44', and 44'' which are actuated in response to the sync signals applied from the control signal generator 40 are provided. Furthermore, instead of the quantization circuit 14 shown in FIG. 7, three quantization circuits 45, 45' and 45'' which are also actuated in response to the sync signals applied from the control signal generator 40 are provided. The mode of operation is substantially the same as that described with reference to FIG. 7 so that no description will be made. It is clear from the foregoing description that the shift register 42 may handle analog information.

Figure 9:
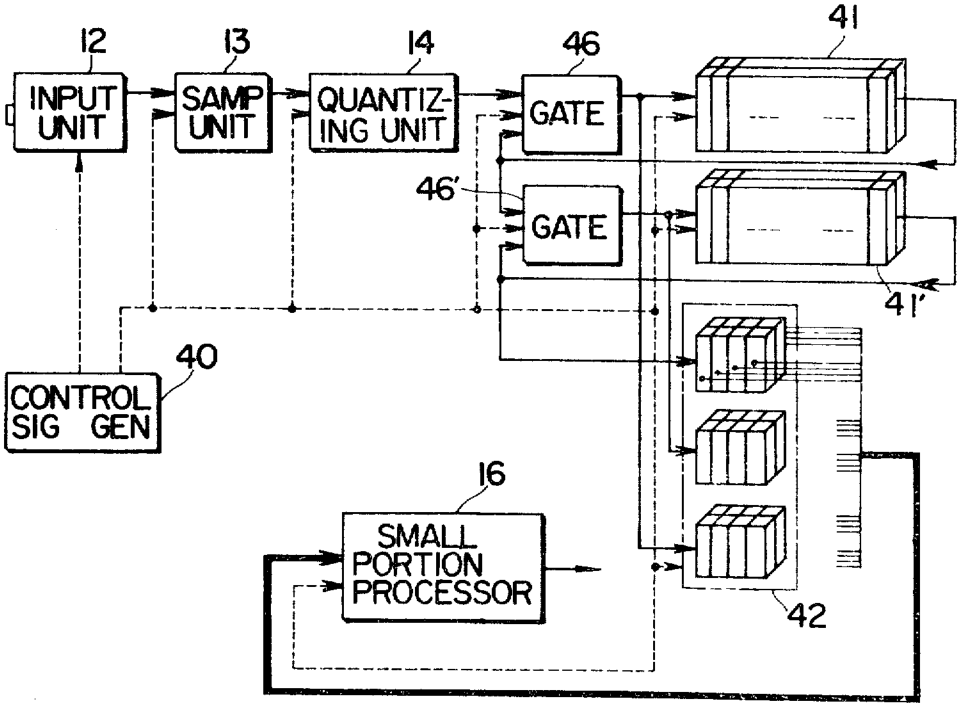
FIG. 9 is a block diagram of an inspection equipment similar to that shown in FIG. 7 except that another variation of the two-dimensional image extracting device is incorporated therein.

FIG. 9 shows a variation of the embodiment shown in FIG. 7 for storing information for every $j$ scanning lines into the shift register 42. The inputs to the shift registers 41 and 14' are controlled by gates 46 and 46' respectively, which, in turn, are controlled by the sync signals applied from the control signal generator 40 in synchronism with the scanning signals. In the instant embodiment, it is assumed that $j = 3$ and information on the first scanning line is stored in the shift register 42. In response to the scanning of the first line an ON signal is applied from the control signal generator 40 to the gates 46 and 46', so that the gate for applying the output of the circuit 14 to the shift register 41 is opened, whereas the gate for applying the output of the shift register 41 to the input terminal thereof is closed and, similarly, the gate for applying the output of the shift register 41 to the input terminal of the shift register 41' is opened, whereas the gate for applying the output of the shift register 41' to the input terminal thereof is closed. On the other hand, in response to the scanning of the second and third lines, an OFF signal is applied to the gates 46 and 46' so that the gate for applying the output of the circuit 14 to the input terminal of the shift register 41 is closed, whereas the gate for applying the output of the shift register 41 to the input terminal thereof is opened and, similarly, the gate for applying the output of the shift register 41 to the input terminal of the shift register 41' is closed, whereas the gate for applying the output of the shift register 41' to the input terminal thereof is opened. In other words, the contents in the shift registers 41 and 41' are circulated when the second and third scannings are made. In response to the fourth scanning the operations described above with reference to the first scanning are recycled. In a manner described above the output signal of the circuit 14 is applied to the shift register 41, the contents of which are transferred into the shift register 41' for storage. Similarly, the information for every three scanning lines is stored in the shift register 42. In this manner, the video information may be processed in a manner substantially similar to that described with reference to the first embodiment shown in FIG. 7.

Figure 10:
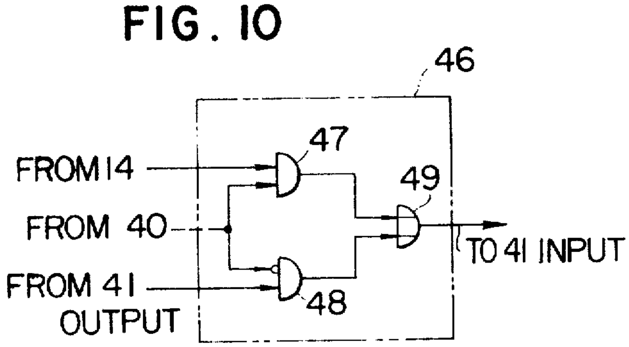
FIG. 10 is a detailed view of a component of the inspection equipment shown in FIG. 9.

As shown in FIG. 10 each of the gates 46 and 46' may comprise an AND gate 47, a NAND gate 48 and an OR gate 49.

Figure 11:
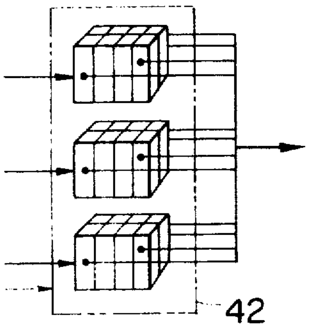
FIG. 11 is a view used for the explanation of the inspection equipment shown in FIG. 9.

When it is desired to input the coarse video information on a scanning line to the processing device 16, the output lines from the shift register 42 to the processing device 16 may be skipped as shown in FIG. 11 and the width of the timing signal applied to the processing device 16 from the control signal generator must be increased accordingly. This arrangement is particularly advantageous when two different sets of information are processed in the processing device 16 and the information processing cannot be completed within the sampling period of the sampling circuit 13. Next the processing device 16 will be described.

Small Portion Extracting Device

1. Boundary Space Method

Figure 12:
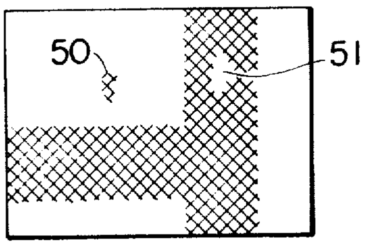
FIGS. 12–15 are views used for the explanation of the boundary spacing method in accordance with the present invention.
Figure 13:
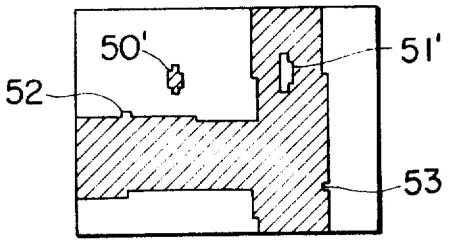

FIG. 12 shows a part to be inspected in which the two-dimensional dark and bright pattern gradually changes in intensity at the boundary between the dark and bright areas. The bad spots or defects in the dark and bright areas are indicated by 50 and 51, respectively. FIG. 13 shows an image of that shown in FIG. 12 which is sampled and quantized according to binary levels, and the bad spots which correspond those 50 and 51 are indicated by 50' and 51' respectively. It is seen that the boundaries have a projection 52 and a notch 53 which are formed due to the quantization of the image. In the processing device, the micro-spots such as 50′, 51′, 52 and 53 which may be the bad spots are extracted from the quantized image shown in FIG. 13 and are detected whether they are bad spots or merely the projection or notch at the boundary so that only the bad spots may be extracted or detected.

Figure 14:
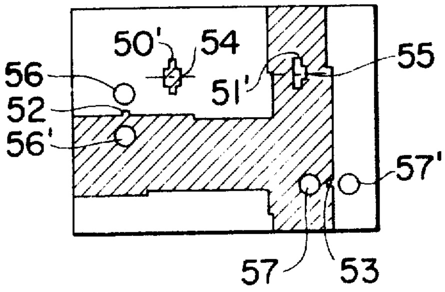

Next referring to FIG. 14 the principle of the method for extracting the micro-spots which may be the bad spots or projections or notches at the boundary will be described. The method for extracting a micro-spot off the boundary is to extract the picture elements whose brightness changes from bright, dark and bright or dark, bright and dark in one direction of the picture elements. For example, the bad spots 50′ and 51′ may be detected because the brightness changes from bright, dark and bright and dark, bright and dark along the horizontal lines 54 and 55 respectively. However, there is a fear that a horizontally elongataed micro-spot or bad point may not be detected so that a bad spot must be detected in the vertical direction and, if required in the slanting direction. Therefore, any bad spot may be detected with a required degree of accuracy, in practice.

Figure 15:
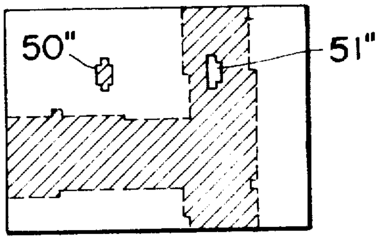

As for the extraction of the projections or notches at the boundaries, two micro-regions are selected in such a manner that each picture element may be interposed therebetween. If one of the micro-regions is dark or bright when the other micro-region is bright or dark, then the projections or notches at the boundaries may be identified. For example, the projection 52 at the boundary is interposed between two microregions 56 and 56′, and the micro-region 56 is bright whereas the micro-region 56′ is dark, so that the projection 52 may be identified. Similarly, the notch 53 is interposed between two micro-regions 57 and 57′ and the former is dark whereas the latter is bright. It should be noted that the two micro-regions must be so selected as to have an insensitive band. When the micro-spots extracted in the manner described above are compared with each other, the bad spots 50″ and 51″ may be distinguished from the projection and notch at the boundaries as shown in FIG. 15.

Figure 16:
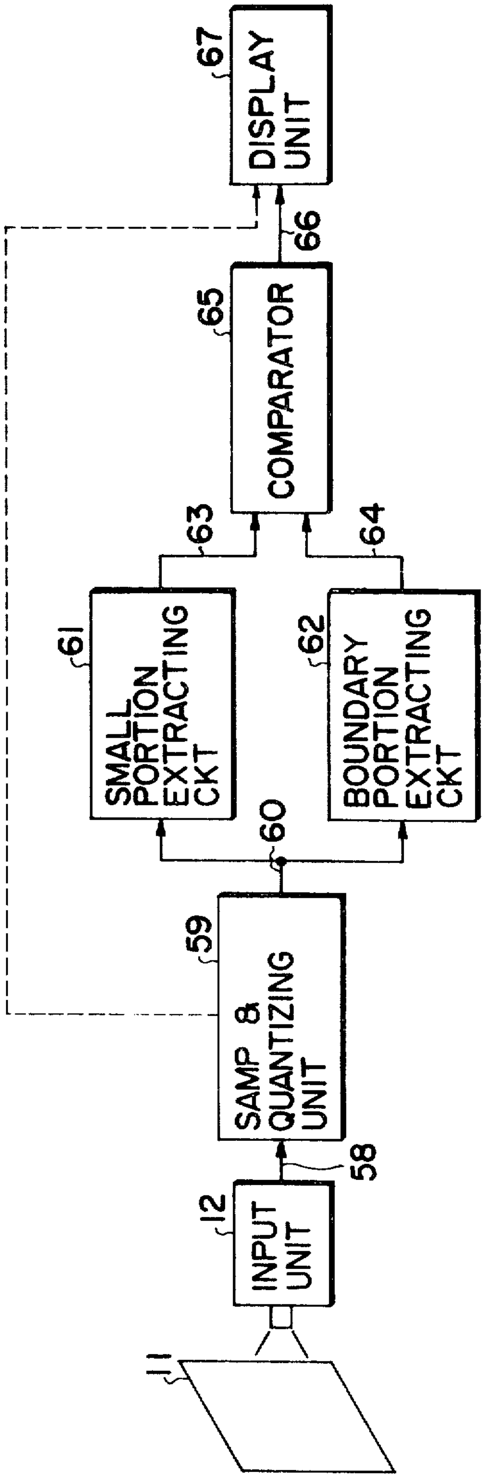
FIG. 16 is a detailed block diagram of FIG. 1.

Next, the processing device based upon the boundary space method described above will be explained with reference to FIG. 16 which illustrates in block diagram form the equipment shown in FIG. 1 provided with a processing device. The optical image of a part 11 such as a printed circuit to be inspected is converted into electrical video signals by photoelectric converter 12. A block 59 comprises a binary conversion circuit 14, a sampling circuit 13, and a device 15 for extracting the two-dimensional micro-spot video information 58 from the continuous video signal 58. The inspection equipment further comprises a circuit 61 for extracting the mirco-spots from the pattern based upon the above described boundary space method and a circuit 62 for extracting the boundaries of the pattern. Instead of the device 61, a device based upon the enlargement-reduction or boundary averaging method to be described hereinafter may be used. The micro-spot or local video signal 60 is applied to both the micro-spot extracting circuit 61 and the boundary extracting circuit 62, and the output signals 63 and 64 of the circuits 61 and 62 are applied to the comparator 65 so that its output signal 66 may only represent the true bad spot. The bad spot is displayed by a bad spot display device 67 such as a TV monitor. If required, not only the bad spots, but also the background may be displayed in different colors as shown in FIG. 15 so that the position, sizes, types and the like of a bad spot may become more apparent.

Figure 17:
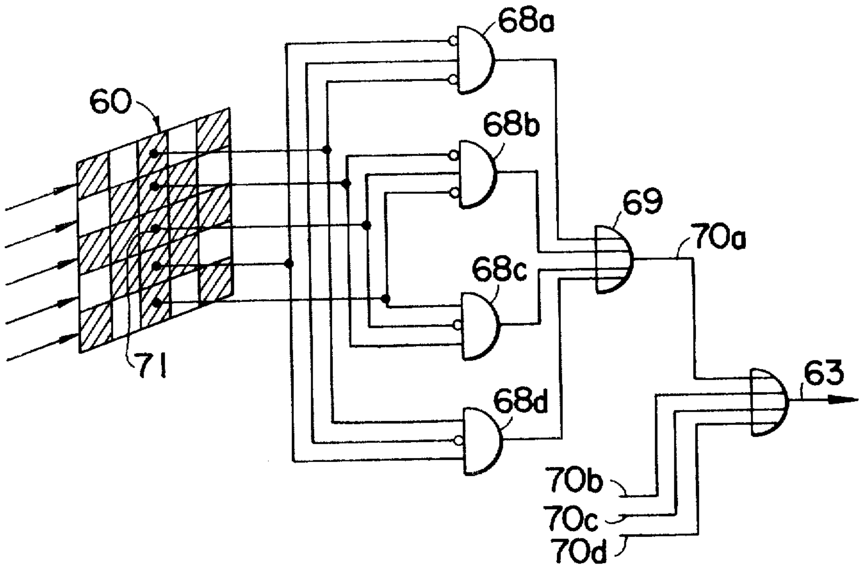
FIG. 17 is a diagram of a micro-spot extracting circuit based upon the boundary spacing method.
Figure 18:
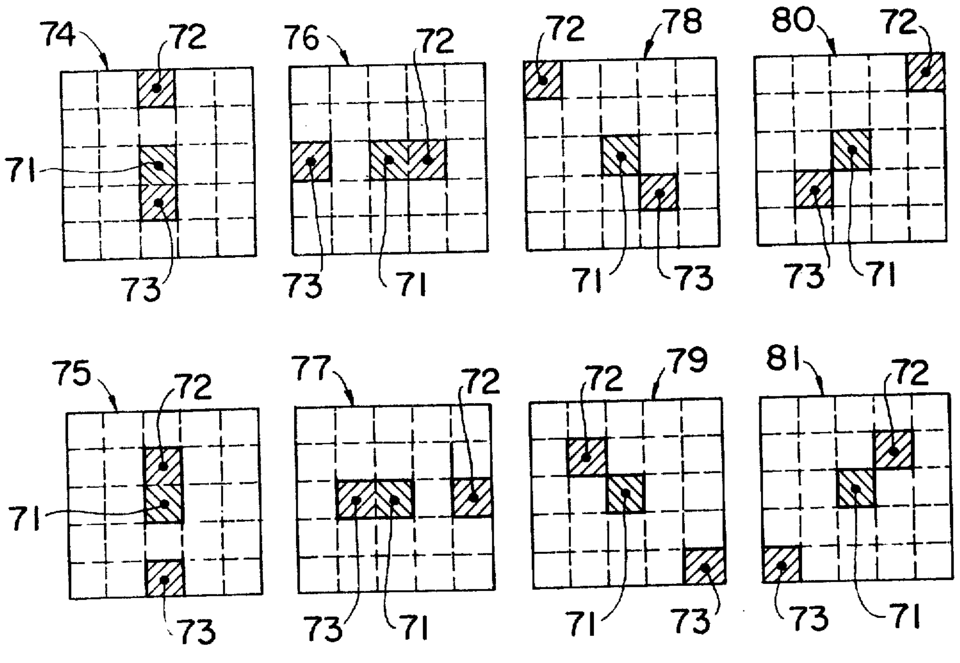
FIG. 18 shows logic patterns used for the explanation of the boundary spacing method.

One example of a small portion extracting circuit 61 is shown in FIG. 17. Some examples of the portions of the image consisting of 5 × 5 picture elements are shown in FIG. 18, and any microspot consisting of two or one picture elements is to be detected and extracted. In FIG. 18, reference numeral 74 and 75 designate logic patterns for detecting and extracting a micro-spot in the vertical direction; 76 and 77, those used in the horizontal direction; and 78, 79 and 80 and 81, those used in the diagonal directions. The circuit 61 is shown in FIG. 17 in conjunction with the logic patterns 74 and 75, and the output 70*a* becomes 1 when there is a micro-spot consisting of row or one picture element in the vertical direction. 68*a*, 68*b*, 68*c* and 68*d* are AND circuits and the inverted inputs are applied to the input terminals with the symbol *o* . 69 is an OR circuit. The circut shown in FIG. 17 is so arranged that its output 70*a* is 1 when the center picture element 71 is 1 and both the picture elements 72 and 73 are 0 or when the center picture element 71 is 0 and both the picture elements 72 and 73 are 1. Similarly, from the logic circuits arranged for the logic patterns 76–81 shown in FIG. 18 are derived the outputs 70*b*, 70*c*, and 70*d* which are all 1. Consequently, when the picture element 71 is one of the two adjacent picture elements or a single picture element, the OR circuit 63 delivers an output 1.

Figures 19, 20, 21, 22:
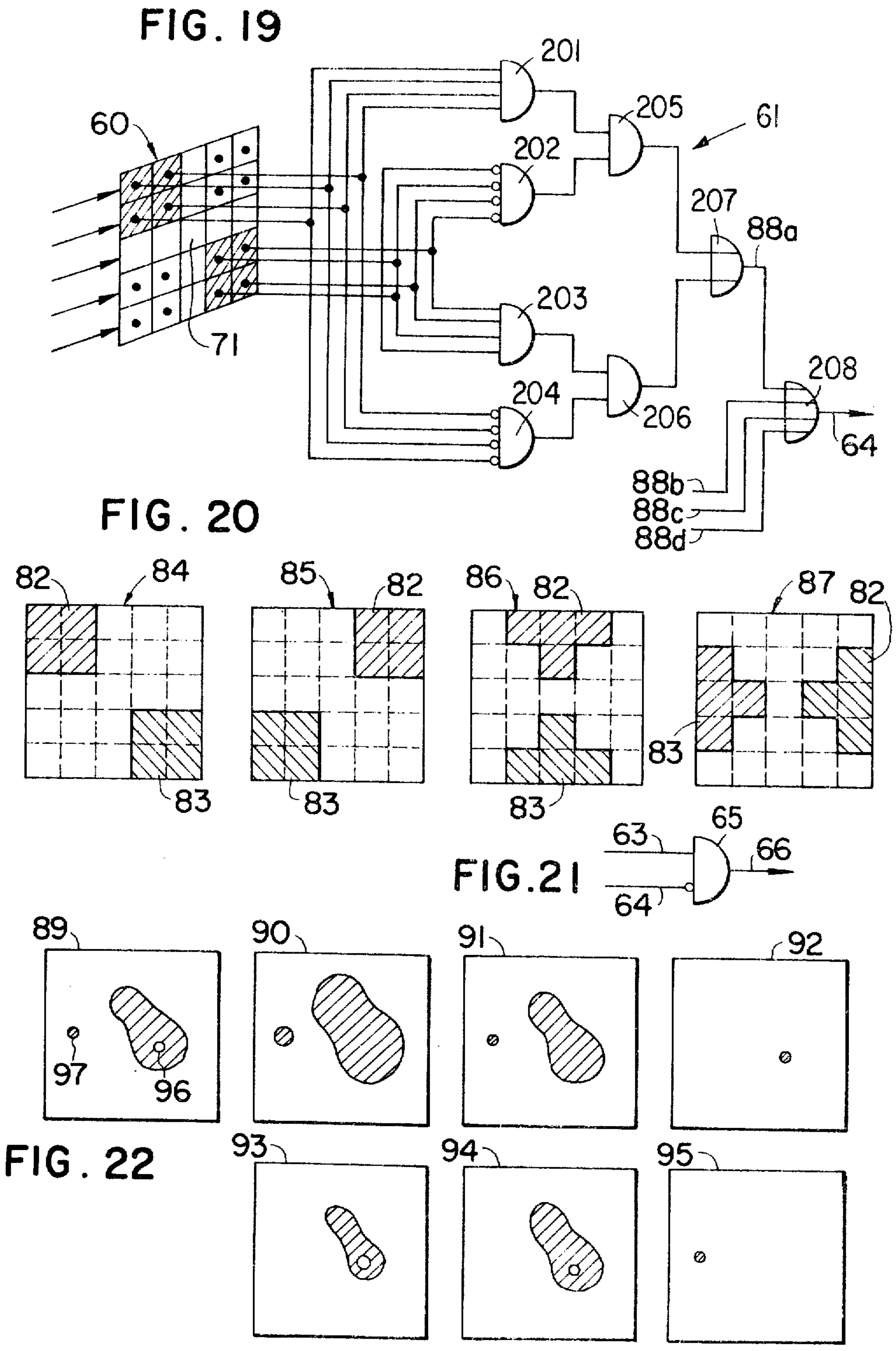
FIG. 19 is a diagram of the boundary extracting circuit shown in FIG. 16.
FIG. 20 shows logic patterns used for the boundary extraction method in accordance with the present invention.
FIG. 21 illustrates one example of a comparator used in the inspection equipment shown in FIG. 16.
FIGS. 22–27 are views used for the explanation of the enlargement-reduction method in accordance with the present invention.

One example of the circuit 62 for extracting the boundaries of the pattern is illustrated in FIG. 19, and the logic patterns to be handled by the circuit 61 including gates 201–208 shown in FIG. 19 are illustrated in FIG. 20. That is, the logic patterns 84 and 85 and 86 and 87 are used to extract the boundaries having no defect in the diagonal, vertical and horizontal directions, respectively. When the center picture element 71 is taken into consideration and if the picture elements in the micro-regions 82 and 83 are all 0 and 1 and 0 respectively, the picture element 71 is identified as being located on the boundary having no defect. The picture elements including 71 but excluding the picture elements in the micro-regions 82 and 83 belong to the insensitive region. In FIG. 19 the logic pattern 84 shown in FIG. 20 is used so that when the boundary has no defect in the diagonal direction, the circuit 61 gives the output 88*a* 1. Similarly, in the case of the logic patterns 85, 86, and 87, the outputs of the circuit 61 are 1 representing that the boundary has no defect. Thus, the output 64 becomes 1 when the center picture element 71 is located on the boundary having no defect. Thus, the boundary having no defect may be extracted by the spatial logic processing in which the insensitive band is formed around the center. It should be noted that the boundary portion extracting circuit 61 of the type described above may be used in combination with a small portion extracting device based upon the enlargement reduction boundary averaging method. In this case, a comparator 18 is inserted in the next stage.

FIG. 21 shows one example of the comparator 65 for comparing the output 63 of the small portion extracting circuit 61 with the output 64 of the boundary portion extracting circuit 62. Only the true micro-spot or bad spot is derived from this comparator 65. That is when the center picture element 71 is detected and extracted as a bad spot, the output 63 becomes 1, but when the picture element 71 is detected as being located on the boundary, the output 64 becomes 1. Therefore, the output 69 becomes 0 so that the picture element 71 is identified as a projection or notch on the boundary. When the output 64 is 0, the output 69 becomes 1 which represents that the picture element 71 is a bad spot off the boundary.

2. Enlargement-Reduction Method

For the sake of explanation it is assumed that the part 11 to be inspected (see FIG. 1) has a pattern consisting of 1 s and 0 s. For example, let the area 1 be taken into consideration. When the area 1 is two-dimensionally enlarged or expanded and then reduced again, the relatively small area 0 included in the area 1 disappears. Similarly, when the area 0 is enlarged and then reduced two-dimensionally, the relatively small area 1 included in the area 0 disappears. The important feature of the enlargement and reduction method is that the area 1 or 0 is restored to its original configuration and position but the small area 0 or 1 included disappears.

Therefore, it follows that when a two-dimensional pattern including a very minute defect is processed by the enlargement-reduction method, the same pattern not including the defect may be obtained. This restored pattern may be used for various purposes. For example, a printed circuit having a bad spot may be photographed and processed in the manner described above. Alternatively, the image of the printed circuit may be converted into the electrical signals, processed in the manner described above, and then converted into an optical image, again.

The processed pattern may be compared with the original pattern, so that only the defect area may be extracted, as will be described in more detail hereinafter. Referring to FIG. 22, the hatched area is assumed to be 1 whereas the white area is 0. The area 1 includes a small area 0 indicated by 96 whereas the area 0 includes a small area 1 indicated by 97.

First the area 1 in pattern 89 of FIG. 22 is enlarged, that is the boundary of the area 1 is enlarged or expanded toward the area 0 by the same distance so that the pattern shown at 90 in FIG. 22 is obtained. By the above process, the area 96 contracts and disappears whereas the area 1 is enlarged.

Next, the area 1 in the pattern 90 is reduced, that is the boundary is reduced by the same distance toward the area 1 from the area 0 so that the pattern 91 is obtained. It is seen that the small area 96 is not restored, but the original area 89 is restored. In other words, the small area 0 included in the area 1 is eliminated as shown in the pattern 91.

By the comparison of the original pattern 89 with the processed pattern 91, a pattern 92 is obtained which includes the area 1 at the position corresponding to that of the defect or area 0 89 of the original pattern.

When the area 1 of the pattern 89 is reduced, a pattern 93 is obtained. When the area 1 of the pattern 93 is enlarged or expanded, a pattern 94 is obtained. It is seen that the relatively small area 1 included in the area 0 of the pattern 89 has disappeared. By the comparison of the original pattern 89 with the processed pattern 94, a pattern 95 is obtained which includes the area 1 at the position corresponding to that of the area 1 97 of the original pattern 89.

From the patterns 92 and 95, the small areas included in the original pattern 89 are all detected and extracted. It should be noted that the area 1 being reduced and enlarged means the area 0 being reduced and enlarged.

Figure 23:
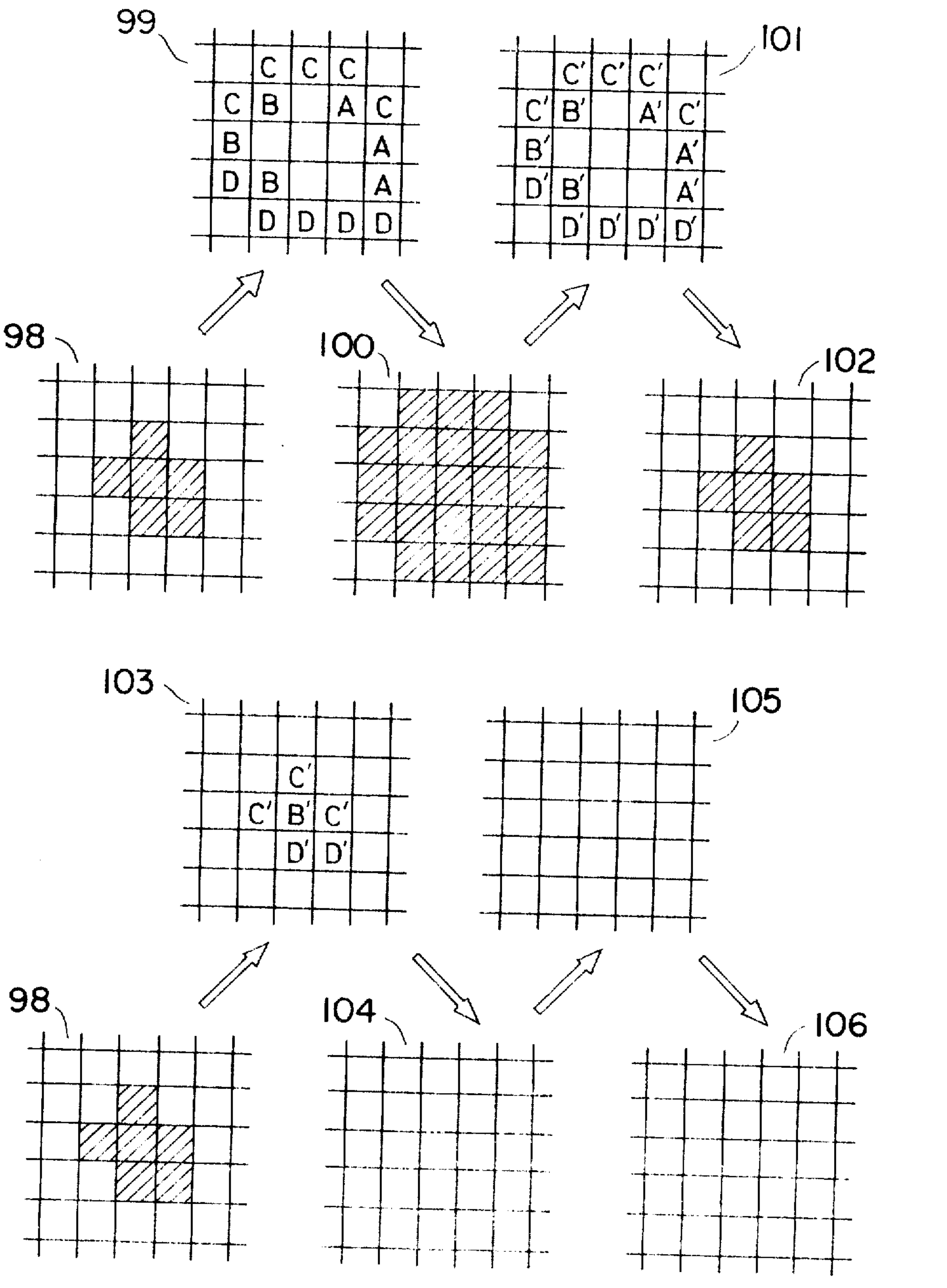

Next, some of the practical examples of the enlargement-reduction method will be described with reference to FIG. 23 illustrating two-dimensional patterns which are divided into a plurality of square picture elements by spacial sampling. Such a sampling method is widely used in the processing of images by digital equipment.

First, each boundary of a picture element in the horizontal direction is displaced and then each boundary in the vertical direction is displaced. A pattern 98 to be processed has the hatched picture elements 1 and the white picture elements 0. The process for enlarging the areas 1 and then reducing them to their original size is illustrated by blocks 99, 100, 101 and 102, and the process for reducing the areas or picture elements and then enlarging them to their original size is illustrated at 103, 104, 105, and 106. Only a micro-spot is processed to restore or eliminate it in the following description.

The elements 1 of the pattern 98 are enlarged in the horizontal direction so that the picture elements A and B in the pattern 99 change from 0 to 1. When the picture elements 1 including the enlarged picture elements are expanded in the vertical direction, the picture elements C and D in the pattern 99 are changed from 0 to 1 so that the pattern 100 is obtained. Next, the picture elements 1 of the pattern 100 are reduced in the vertical direction so that the picture elements C' and D' of the pattern 101 are changed from 1 to 0, and when the picture elements are further reduced in the horizontal direction, the picture elements A' and B' are changed from 1 to 0 so that the pattern 102 is obtained. It is readily seen that the processed pattern 102 is the same as the original pattern 98 and that when a micro-area 1 is enlarged and then reduced, it is restored to its original configuration however small the micro-spot is. This means that the large and small areas 1 shown in the pattern 91 in FIG. 22 are reproduced.

When the picture elements 1 in the pattern 98 are reduced or compressed in the vertical direction the picture elements C' and D' in the pattern 103 are changed from 1 to 0. When the picture elements 1 are further reduced or compressed in the horizontal direction, the picture element B' is changed from 1 to 0 so that the pattern 104 is obtained. When the pattern 104 is enlarged or expanded, the pattern 105 and then the pattern 106 are obtained, but in practice the pattern 104 does not include the element 1 the enlargement or expansion process is not carried out. Thus, it is seen that when the picture element or elements 1 are reduced or compressed and then enlarged or expanded, the picture elements 1 disappear. This corresponds to the area 1 97 which is shown in the pattern 94 is disappeared by the reduction-enlargement method.

Next, a method for eliminating a micro-spot by the enlargement-reduction method without using the spatial sampling (that is, using a continuous pattern in space) will be described. This method uses photographic films (to be referred to as "film or films" hereinafter), and an unexposed film is overlaid upon an exposed and processed film and exposed by the light illuminated from the back of the processed film. It is assumed that a processed film has a pattern consisting of dark and bright areas so that when an exposed film is developed or processed, the dark and bright areas are reversed. (This process will be referred to as "the reversal processing" hereinafter in this specification). In some cases, a processed or original film and an unexposed film are expanded in all directions by the same distance while relative rotation between them is prevented. (This process will be referred to as "the expansion reversal processing" hereinafter in this specification). An unexposed film is so processed that even a small area which has been exposed by the light transmitted through the light area of the original film even for a very short time may become a dark area. Similarly, an area which has not been exposed at all is processed to represent a bright area. The above described conditions may be easily satisfied when the high contrast films (which are readily commercially available) are used.

Figure 24:
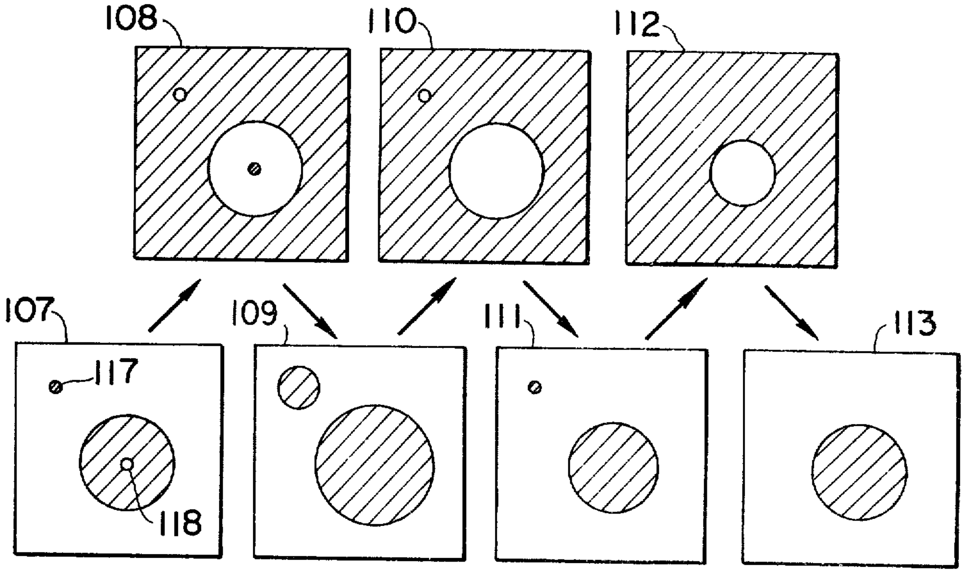
Figure 25:
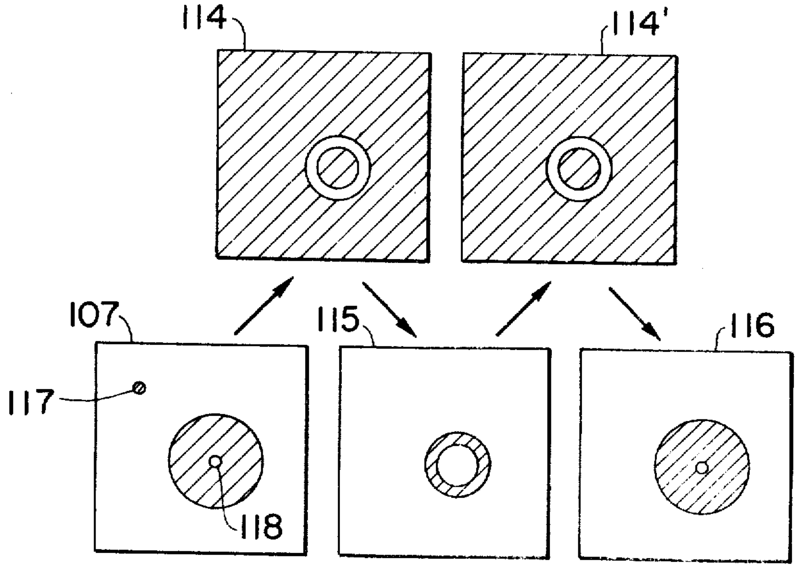

Next, referring to FIGS. 24 and 25 the image forming process will be described in more detail hereinafter. An original image or pattern on a film has dark areas (hatched) and bright areas. The large dark area includes a bright micro-spot 118 whereas the large bright area, a dark micro-spot 117. First, the method for eliminating these micro-spots will be described.

By reversal processing, a pattern 108 is obtained, and by expansion reversal processing of the pattern 108, a pattern 109 is obtained. The pattern 109 includes the expanded or enlarged dark areas of the original pattern 107 and the micro-spot 118 included in the dark area is eliminated.

By the expansion reversal processing of the pattern 109, a pattern 110 is obtained, and by the reversal processing of the pattern 110, a pattern 111 is obtained in which the dark area in the pattern 109 is compressed or reduced. The pattern or image 111 is substantially similar to the original pattern 107 except that the bright micro-spot included in the dark area in the original pattern 107 is eliminated.

From the foregoing description, a bright micro-spot included in the dark area of an original image or pattern may be eliminated by the process of enlarging the dark area and then reducing it (which is substantially similar to the process of enlarging the bright area and then reducing it).

From the comparison of the original image 107 with the processed film 111, the eliminated micro-spot may be readily detected. When the original film 107 is overlaid upon and registered with the processed film 110, only the bright micro-spot 118 may transmit the light, so that it will be readily detected and extracted.

Next, the method for extracting the dark micro-spot 117 from the same original pattern 107 will be described with reference to FIG. 25. By the expansion reversal processing of the original image 107, a pattern 114 is obtained in which the dark micro-spot 117 is eliminated. By the reversal processing of the pattern 114, a pattern 115 may be obtained in which the dark area in the original image 107 is reduced or compressed.

By the reversal processing of the film 115, a pattern 114' is obtained, and by the expansion reversal processing of the pattern 114', a pattern 116 is obtained in which the dark area in the pattern 115 is expanded or enlarged. Since the pattern 114 is substantially similar to the pattern 114' by the expansion reversal processing of the original 107 the pattern 114 is obtained, and by the expansion reversal processing of the pattern 114, the pattern 116 is obtained, but in order to establish the one-to-one correspondence between the processes shown in FIG. 24 and FIG. 25, the patterns 114' and 115 are illustrated and described.

In the pattern 116, the dark area in the pattern 115 is expanded or enlarged, and the pattern 116 is substantially similar to the original 107 except that the dark micro-spot 117 is eliminated.

From the foregoing description it is seen that the dark micro-spot included in the bright area may be eliminated by the process of reducing or compressing and then enlarging or expanding the dark area (which is equivalent to the process of enlarging or expanding and then reducing or compressing the bright area).

By the comparison of the original 107 with the pattern 116, the dark micro-spot 117 may be readily detected. When the patterns 108 and 116 are registered on each other, only the micro-spot 117 transmits the light so that it may be easily extracted. Alternatively, when the patterns 110 and 116 are registered to each other, all of the micro-spots 117 and 118 included in the original pattern 107 may be readily detected and extracted.

Referring back to FIG. 24, a pattern 112 is obtained by the expansion reversal processing of the pattern 111, and by the expansion reversal processing of the pattern 112, a pattern 113 is obtained in which all of the micro-spots 117 and 118 included in the original 107 are eliminated. It is seen that the pattern 113 is substantially similar to the original pattern 107 except the eliminated micro-spots.

In the process for obtaining the pattern 113 from the original 107 the dark area is enlarged, reduced and reduced and enlarged again (which is equivalent to the process in which the bright area is first reduced, enlarged and then enlarged and reduced again), and the micro-spots included in the original 107 are all eliminated. By the comparison of the original 107 with the pattern 113, the position and configuration of a micro-spot or bad spot may be easily detected. As described hereinbefore, when the orininal 107 is registered with the pattern 110, the bright micro-spot 118 in the dark area may be detected and extracted, and when the pattern 108 is registered with the pattern 113, the dark spot 117 in the bright area 107 may be detected and extracted.

In summary, when a dark or bright area in a two-dimensional binary pattern is enlarged in space by the same amount (distance) and then reduced by the same amount or first reduced by a predetermined amount in space and then enlarged by the same amount, any micro-spot included in the pattern may be eliminated. By the comparison of an original pattern with the pattern processed by one or both of the above methods any micro-spot included in the original pattern may be extracted.

In general, the defects or noise components included in a pattern are very minute, so that they may be readily extracted by the processes described above. The above processes do not require the registration required in general in the pattern recognition system. (By registration, is meant a process for determining a correct relative position between a reference pattern which has been previously stored and an input image of a pattern to be recognized or inspected. The registration is extremely difficult because a pattern to be recognized or inspected does not completely coincide in detail with a reference pattern. This is easily presumed from the fact that a part to be inspected has various defects.) Therefore, the processes in accordance with the present invention are very simple. The processes of the present invention may be applied to the inspection of the printed circuits, ICs or printed characters. In the conventional system in which the registration is required, it is extremely difficult to detect and extract the defects or deformations unless a correct reference pattern is stored, but the present invention does not require the storage of a reference pattern, so that the use of a storage device may be eliminated. Furthermore any new pattern which has not been hitherto processed may be readily handled.

In the processes described above, the amount of enlargement or reduction determines the size of a micro-spot or defect to be detected. Therefore, the parameters used for the purpose of detecting a relatively large micro-spot or defect in a large pattern should not be used for detecting a relatively small micro-spot or defect in a small pattern. Such inspection conditions are generally described in detail in the inspection specifications.

Figure 26:
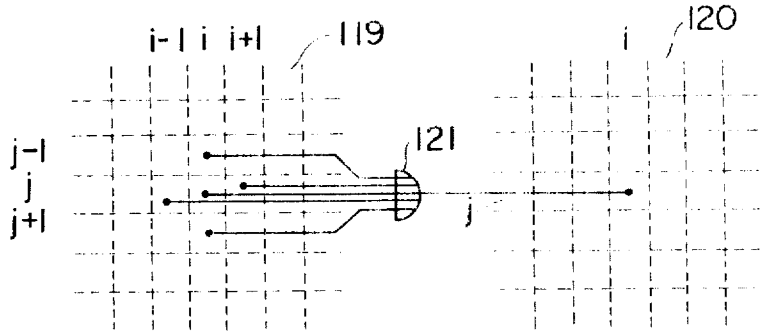

Next referring to FIG. 26, a large number of storage elements are arrayed as shown at 119 and 120 in opposed relation with the space of an image. Any storage element may be used as far as information may be written into and read out from it, and in the instant embodiment the flip-flops are used. In the arrays 119 and 120, each square defined by the broken lines represents a picture element in opposed relation with which is disposed each flip-flop or storage element.

Each flip-flop in the array 119 has the on (1) or off (0) state depending upon the corresponding picture element being bright or dark. For example, when the image input device 12 is a television camera of the type scanning an object horizontally from the upper left to the lower right, the output signals from the quantizing circuit 14 are sequentially stored in the flip-flops in the array 119 from the upper left one to the lower right one. The above arrangement is well known in the art, so that further description there will not be made herein.

The flip-flop array 120, which is substantially similar to the flop-flop array 119, serves to store the information to be processed in a manner described hereinafter. As shown in FIG. 26, each flip-flop in the arrays 119 and 120 is identified by coordinates $(i,j)$.

An OR gate 121 serves to accomplish the enlargement process described hereinbefore. The contents in the five flip-flops $(-l,j)$, $(i,j-l)$, $(i,j)$, $(i,j+l)$ and $(i+l,j)$ in the array 119 are applied to the OR gate 121. The flip-flop (i,j) in the array 120 is also connected to the OR gate 121. Similarly, such an OR gate is provided for every $i$ and $j$. (For example when $i = 1,2, \ldots m$ and $j = 1,2, \ldots n$ a total of $m \times n$ OR gates are provided. The number of inputs to the OR gate is less than five when $i$ and $j$ approach $l$ or $m$ or $n$). Therefore, the enlarged 1 is applied to the flip-flop array 120 from the flip-flop array 119.

Figure 27:
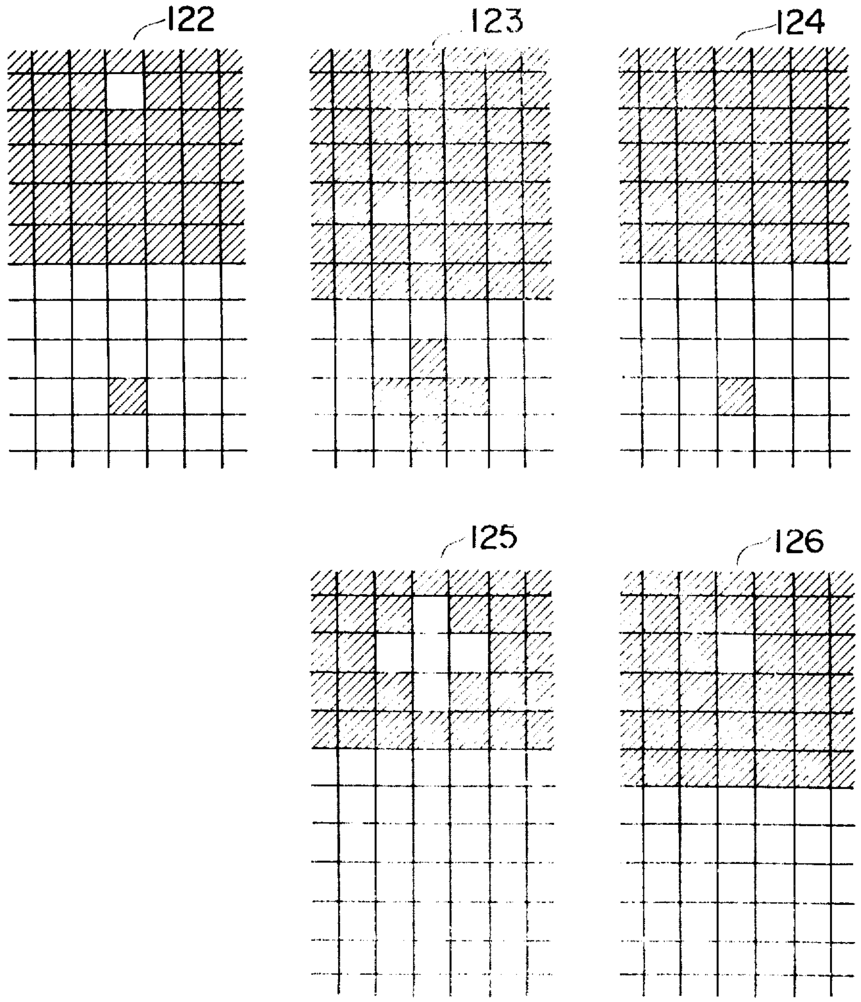

For example, when information is stored as shown in FIG. 27, in the flip-flop array 119 (the hatched square represents the flip-flop state 1 whereas the white square is the flip-flop state 0), information is stored in the flip-flop array 120, as shown at 123 in FIG. 27. This means that the hatched areas are enlarged or expanded.

Next, the method for storing into the flip-flop array 120 the reduced area information of the flip-flop array 119 will be described. This may be accomplished by using AND gates instead of the OR gates 121 shown in FIG. 27. That is, the information stored in the flip-flop array 119 as shown at 123 in FIG. 27 may be stored in the flip-flop array 120 as shown at 124 in FIG. 27. This means that the hatched areas shown at 123 in FIG. 27 are reduced as shown at 124.

The hatched areas shown at 122 are enlarged as shown at 123 and are reduced as shown at 124. It is seen that a white area included in the hatched area shown at 122 disappears in the pattern shown at 123. Therefore, it will be understood that the above described arrangement and principle are accurate.

The process is carried out in two steps in the manner described above, so that the equipment may comprise, in practice, means for storing the video information, a plurality of OR gate means each of which is coupled to a plurality of predetermined storage elements in the video information storage means thereby providing an OR output from the outputs of said predetermined storage elements, storage means for storing the outputs of the plurality of OR gate means, a plurality of AND gate means each of which is coupled to a plurality of predetermined storage elements in the OR gate output storage meams, thereby providing the AND output of the outputs of the predetermined storage elements, and storage means for storing the AND outputs of the plurality of the AND gate means. The states of the third and fifth means are illustrated at 123 and 124 in FIG. 27.

When the second and fourth means are exchanged, the hatched areas are compressed first and then enlarged. The state of the fifth means is illustrated at 126 in FIG. 27 in which the small area 1 included in the large area 0 is eliminated. The states of the first and third means are illustrated at 122 and 125 respectively.

In either of the arrangements in which the information or area is first compressed and enlarged or first enlarged and reduced, the number of $m \times n$ EXCLUSIVE-OR gates may be provided in such a manner that the outputs of the corresponding storage elements in the first and fifth means may be applied to each of the EXCLUSIVE-OR gates. Then the output 1 of the EXCLUSIVE-OR gate means that the states of the corresponding storage elements in the first and fifth storage means are different. Therefore, a small area included in a large area may be extracted, that is, a bad spot or defect may be extracted.

Figure 28:
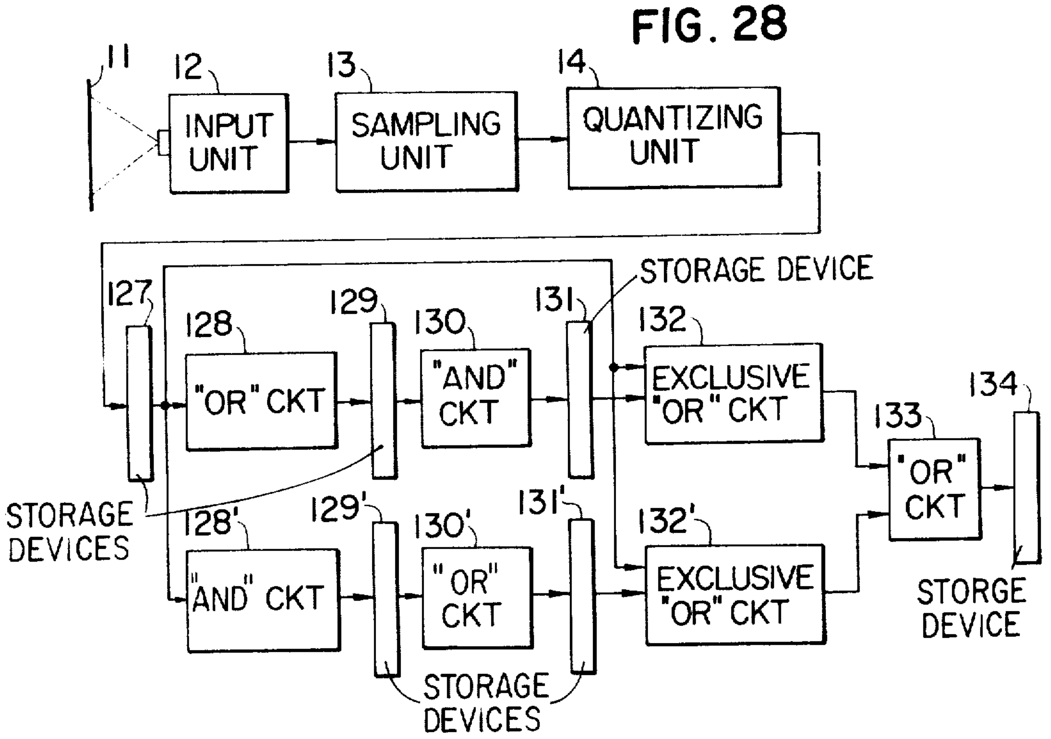
FIG. 28 is a block diagram of inspection equipment similar to that shown in FIG. 1 except that a small portion processing device based upon the enlargement-reduction method is incorporated therein.

FIG. 28 shows a block diagram of one embodiment of the present invention based upon the above described principle of the enlarged-reduction method. The binary output signals from the binary conversion circuit 14 are stored in a storage device 127 which is similar in construction and operation to the flip-flop array 119 shown in FIG. 26. The information stored in the storage device 127 is processed by an OR gate network 128 which is also similar in construction and operation to a plurality of OR gates 121 in FIG. 26 to be applied a storage device 129, which is also similar in construction and operation to the flip-flop array 120 in FIG. 26. The information stored in the storage device 129 is processed by an AND gate network similar in construction and operation to a plurality of AND gates described hereinbefore to be applied to a storage device 131, similar to the flip-flop array 120 in FIG. 26. An EXCLUSIVE-OR gate network 132 functions in the manner described above to give the EXCLUSIVE-OR output from the outputs of the corresponding storage elements in the storage devices 127 and 131. Networks 128', 129', 130', 131' and 132' are similar in construction and operation to 130, 129, 128, 131, and 132, respectively. An OR gate network 133 is provided to give the OR output from the outputs of the corresponding storage elements in the storage devices 132 and 132'. The output of the OR gate network 133 is stored in a storage device 134.

As described hereinbefore, the storage elements which are 1 in the storage device 129 are the enlargement or expansion of the storage elements 1 in the storage device 127. The storage elements which are 1 in the storage device 131 are the reduction of the storage elements which are 1 in the storage device 129. The storage elements which are 1 in the storage device 29' are the reduction of the storage elements which are 1 in the storage device 127. The storage elements which are 1 in the storage device 131' are the enlargement of the storage elements which are 1 in the storage device 129'. Therefore, the small "area" included in the large "area 1" in the storage device 127 is eliminated in the storage device 131. The small "area" 1 included in the large "area" 0 in the storage device 127 is eliminated in the storage device 131'. When the EXCLUSIVE-OR outputs are derived from the outputs of the corresponding storage elements in the storage devices 127 and 131, only the small area 0 included in the large area 1 in the storage device 127 is derived as "the area" 1. Similarly, the small "area" 1 included in the large "area" 0 in the storage device 127 is derived as the "area" 1 when the EXCLUSIVE-OR outputs are derived from the contents in the storage devices 127 and 131'. When the OR outputs are derived from the outputs of the corresponding storage elements in the storage devices 132 and 132', only the small "areas" in the storage device 127 are stored as 1s in the storage device 134.

Figure 29A:
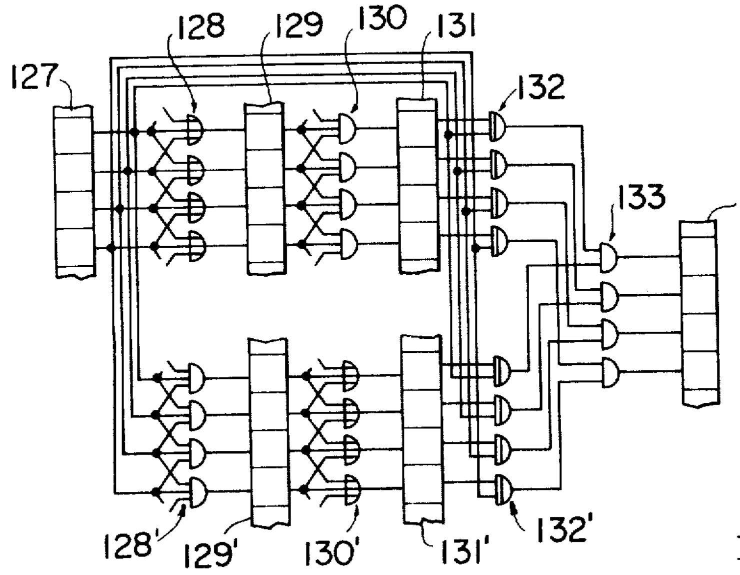
FIG. 29 is a diagram of a small portion extracting circuit based upon the enlargement-reduction method.

The networks 127–134 and 128'–132' are illustrated in detail in FIG. 29A. Only one vertical line is shown for the sake of simplicity, but the similar circuit components are stacked perpendicular to the plane of the drawing, in practice. The input terminals of the AND gates, OR gates and EXCLUSIVE-OR gates which are arranged in a manner substantially similar to that described above, are not shown for the sake of simplicity.

Figure 29B:
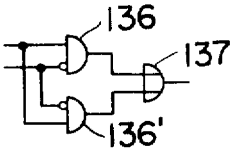

Each square of the storage devices 127, 129, 131, 129', 131', and 134 represents a storage element for each picture element and stores a 1 or 0 depending upon whether the corresponding picture element is bright or dark. Reference numerals 128, 130', and 133 designate the OR gate networks; 130 and 128', the AND gate networks; and 132 and 132', the EXCLUSIVE-OR gate networks. Each EXCLUSIVE-OR gate may be provided from two AND (NAND) gates 136 and 136' and an OR gate 137 connected as shown in FIG. 29B.

In the instant embodiment, the center picture element as well as four adjacent picture elements are processed, but it will be understood that the picture elements to be processed is not limited to five. When a bad spot- or micro-spot to be processed is larger than a picture element, the number of picture elements to be processed must be increased accordingly. Furthermore, in order to overcome the problem of directions of the enlargement and reduction, it is preferable to handle all of the picture elements included in a circle whose center coincides with the center picture element. When a pattern, except a bad spot, consists of a horizontally or vertically extending areas, it is preferable to handle or process a cross-shaped picture elements as a center element, that is, a center picture element extended in the vertical and horizontal directions.

In some cases it is more efficient to process the picture elements in steps than to process all of the picture elements simultaneously. For example, instead of enlarging in both the vertical and horizontal directions by one picture element in the manner described with reference to FIG. 26, the center picture element may be enlarged only in the vertical or horizontal direction by one picture element. In this case, a similar result may be attained. This method corresponds to the process described with reference to FIG. 23. When the process is accomplished in steps, the processing time is increased, but the processing equipment becomes simple in construction.

Figure 30:
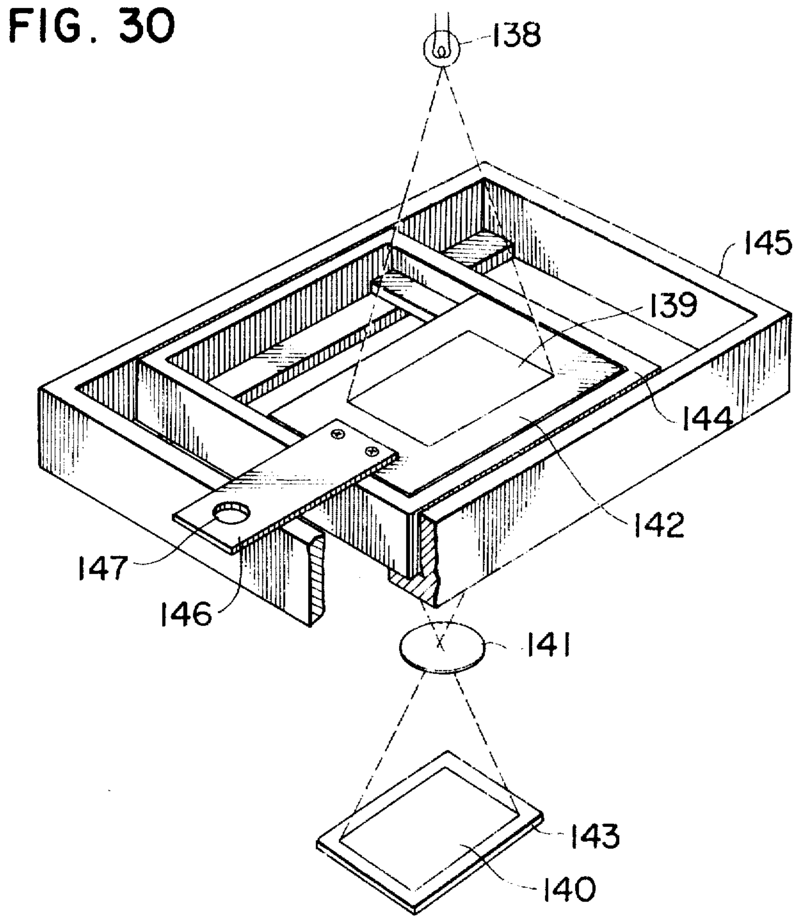
FIG. 30 is a perspective view of an optical processing device based upon the enlargement-reduction method.

Next referring to FIG. 30, equipment for accomplishing the optical processing methods described hereinbefore with reference to FIGS. 24 and 25 will be described. In practice, a condenser lens (not shown) is interposed between a light source 138 and an original film 139 in order to provide uniform illumination. An unexposed film 140 is placed upon a frame 143. The original film 139 corresponds to the original pattern 107 in FIGS. 24 and 25, whereas the unexposed film 140 is used to obtain the pattern 108. When the pattern 108 shown in FIGS. 24 and 25 is used as the original film 139, the unexposed film 140 is used to obtain the pattern 109. The image on the original film 139 is focused within the same size through a projection lens 141 upon the unexposed film 140 placed on the frame 143. The original film 139 is placed upon a frame 142 which, in turn, is slidably placed on a frame 144 which, in turn, is placed upon a frame 145 for slidable movement in the longitudinal direction. The positions of the light source 138, the frame 145 and the lens 141 are fixed.

An operating lever 146 whose one end is fixed to the frame 142 has an aperture 147 through which a pin extends from the frame 145 so that the movement of the frame 142 by the operating lever 146 is limited by the engagement of the pin with the aperture 147. Furthermore, the rotation of the frame 142 is prevented.

Next, the mode of operation will be described. First, the light source 138 must be turned off and the operating level 146 is adjusted so that the pin is located at the center of the aperture 147. The holder 143 is adjusted so that the image of the original film 139 may be focused through the projection lens 141 upon the unexposed film 140. Next, the lamp 138 is turned on and the operating lever 146 is actuated in such a manner that the pin may move along the whole side edge of the aperture 147. Thereafter, the lamp 138 is turned off and the exposed film 140 is processed. Thus, an expanded and reversed image is obtained. When it is desired to obtain a reversed image, the operating lever 146 must be maintained stationary.

The above exposure process must be effected in a dark room. It is preferable to use a high contrast film such as a film used for preparing a printing plate. The aperture in the operating lever 146 must be determined depending upon the enlargement or reduction amount or scale and, of course, upon the size of the pin. In general, the aperture is circular in order to eliminate the problem of the direction of the enlargement or reduction, but in some cases an aperture may have a special configuration depending upon the purpose. The position of the holder 143 must be correctly determined because it, in turn, determines the distance or length between the original film 139 and the unexposed film 140 and, also, the accuracy in registration between two processed films when they are registered with each other, in order to extract a micro-spot in the manner described with reference to FIG. 24 with the two patterns 110 and 107. It is, therefore, preferable that the holder 143 be located in a predetermined position in the equipment.

The equipment of the type described above may be used, for example, for correcting a pattern having a micro-spot or bad spot. A pattern which is used for the manufacture of prined circuits or the like and which has bad spots or defects caused from drawing the pattern may be corrected by this equipment. Furthermore, an original film used for printing a number of copies may be also corrected by this equipment, so that the original film may have no defect or flaw. The equipment is also used to provide a pattern showing only the bad spots.

When the printed circuits which are manufactured with a pattern having a sharp angle are inspected by the equipment of the present invention, the portion having a sharp angle may be detected as a defect or bad spot. However, when the original pattern used in the inspection is corrected in the manner described above, the portion having a sharp angle may be eliminated, so that this portion may be prevented from being mistakingly extracted as a bad spot. Therefore, the equipment may be used for preparing a reference pattern best adapted for use with the micro-spot inspection equipment in accordance with the present invention. It is, of course, understood that a reference pattern in which a sharp angle portion included in an original pattern will not adversely affect the result of the inspection of the parts manufactured from the original pattern.

As described hereinbefore, an area in one binary state in a two-dimensional binary pattern is enlarged or reduced in two-dimensional space and then reduced or enlarged, so that the micro-spots or bad spots included in the pattern may be eliminated.

By comparing the original pattern with a pattern obtained by one or both of the methods described above, only the micro-spots or bad spots included in the original pattern may be detected and extracted. In enlargement and reduction, the boundary line is preferably enlarged or expanded and reduced or compressed in the direction perpendicular to the boundary line, but the present invention is not limited to this method alone.

The eliminated or extracted micro-spot or bad spot is very closely related with the expansion and compression of the boundary line. The higher the degree of expansion or reduction, the larger the size of the eliminated or extracted micro-spot or bad spot becomes.

Therefore, when it is desired to eliminate or extract a micro-spot or bad spot according to the present invention, it is preferable that the pattern (which must be the correct pattern having no defect or flaw) is larger in size than a bad spot. When the sizes of the original pattern and the defect are different, only the defect may be eliminated or extracted without adversely affecting the original pattern by suitably selecting the displacement of the boundary line in expansion or reduction.

Even if the above conditions are not fully satisfied, a bad spot or defect may be partly eliminated or extracted and when the same process is cycled, the bad spot or defect may be completely eliminated or extracted. Therefore, there is no problem in practice. For example, a bad spot included in a printed circuit is generally smaller in size than the conductor and nonconductor patterns. When a relatively large defect intersects the original pattern such as a conductor pattern, the intersection generally has an acute angle, so that a gap between the defect and the original pattern tends to be detected as a micro-spot or bad spot. Therefore, a relatively large defect may be detected from the gap between the defect and the original pattern which is detected in the manner described above.

According to the present invention, a relatively small spot included in an original pattern may be eliminated or extracted so that a complex pattern may be corrected, that is, a pattern from which the noise components are entirely removed may be provided. Alternatively, only the defects or noise included in a complex pattern may be reproduced as a pattern.

For example, a thin portion and a non-printed portion of a character pattern may be corrected, so that a correct character pattern may be provided for display or the like. When the present invention is applied to a pattern or character recognition system, the character recognition efficiency may be much enhanced. Furthermore, only the defects may be extracted and displayed as a measure of correction.

2. Boundary Averaging Method

Figure 31:
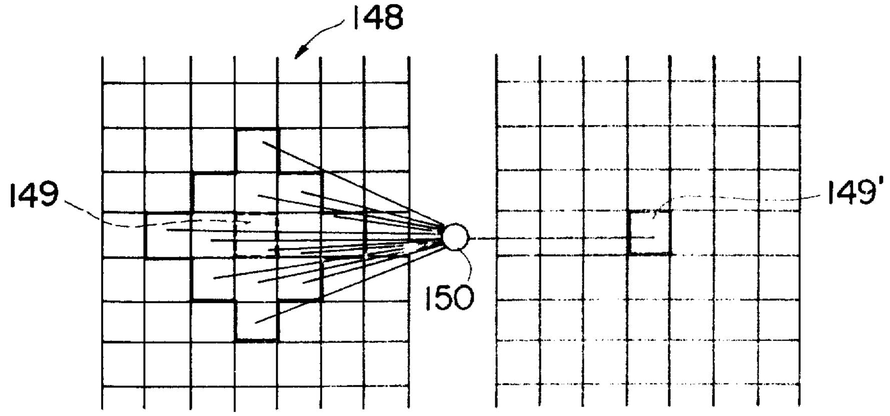
FIGS. 31–35 are views used for the explanation of the boundary averaging method in accordance with the present invention.

The boundary averaging method for extracting or eliminating a micro-spot included in a pattern will be described hereinafter with reference to FIG. 31. First a central point 149 in a pattern 148 is selected and the area surrounding the central point 149 is investigated. If the number of surrounding areas 1 or 0 is larger than the number of areas 0 or 1, then the central point 149 is determined to have 1 or 0 and a new pattern 149' which represents 1 or 0 is generated at the position corresponding to the central point 149. The above operation is cycled over the whole surface of the pattern 148, so that a micro-spot included in the pattern may be eliminated. In FIG. 31, the two-dimensional sampled pattern or image is illustrated, but the boundary averaging method may be also applied to an n-dimensional image or pattern ( where $n = 1$ ) which may be a continuous or sampled pattern or image. In case of a continuous image, the area 1 is compared with the area 0. In the instant embodiment shown in FIG. 31, 13 picture elements surrounding the central picture element 149 are investigated, but the number of picture elements to be investigated may be determined depending upon the size of a micro-spot to be detected. In the case of a continuous image, the threshold level is determined to be one half of the area to be investigated.

A device 150 is so arranged, that when the number of inputs 1 or 0 from the surrounding picture elements is in excess of one half of the surrounding picture elements being investigated, the device 150 generates a signal 1 or 0.

Figures 32A, 32B:
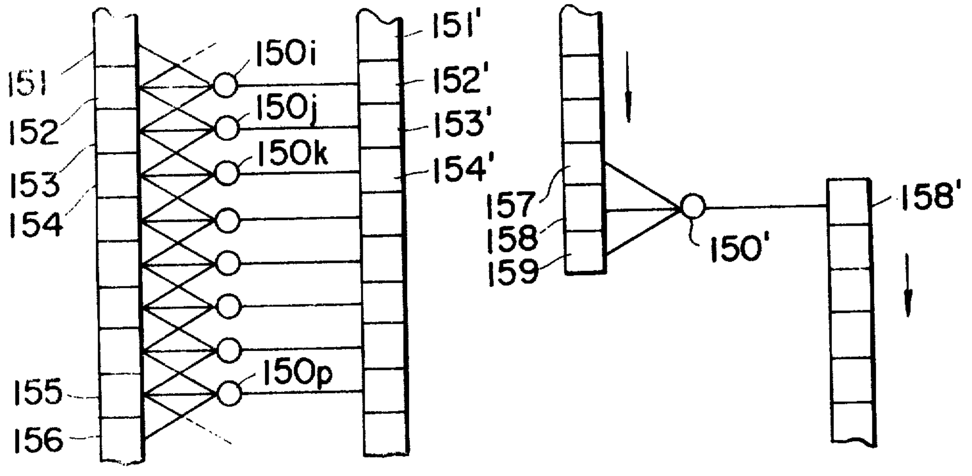
Figure 33:
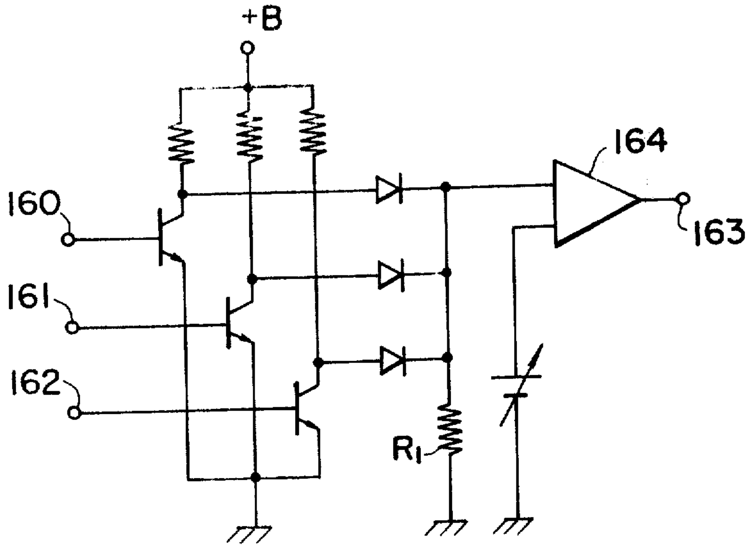
Figure 34F:
Figure 34G:
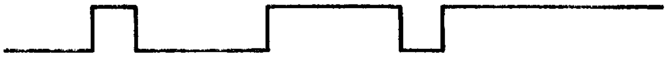
Figure 34H:
Figure 34I:
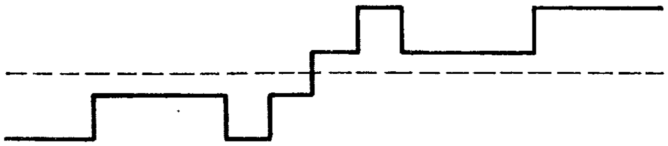
Figure 34J:
Figure 34K:
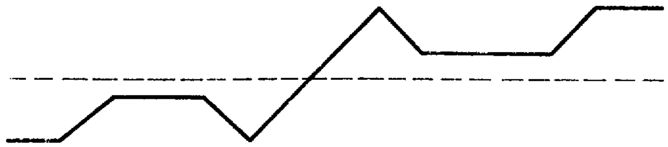

Next, the boundary averaging method will be described with reference to a simple one-dimensional image or pattern. FIG. 32 A shows a device for generating a pattern by parallel processing a one-dimensional image which is sampled, and FIG. 32B shows a device for generating a pattern by sequential processing of a one-dimensional image which is sampled. Devices 150*i*, 150*j*, 150*k*, . . . and 150*p* are illustrated in detail in FIG. 33. A device 150' shown in FIG. 32B is similar to that shown in FIG. 33. It is assumed that a picture element 152 is selected to generate a pattern 152'. In this case, two adjacent picture elements 151 and 153 are investigated together with the picture element 152, and the outputs are applied to the input terminals 160, 161, and 162 of the device 150*i*. If more than two outputs are applied to the device 150*i*, the voltage across a resistor $R_1$ increases so that a gate 164 is opened and the output is derived from an output terminal 163. As a result, the pattern 1 or 0 is generated at 152'. In a manner similar to that described above, the patterns 153', 154', . . . are generated.

In the device shown in FIG. 32B both original and generated patterns are simultaneously shifted in order to generate the patterns by only one device 150'.

The parallel and sequential or serial processing devices described above with reference to FIGS. 32A and 32B may be also applied to an *n*-dimensional image or pattern which is sampled, but the description will not be made because the arrangement is apparent to those skilled in the art from the above description.

FIGS. 34 A–34F show a variation of the device for generating a pattern by the parallel processing of an one-dimensional image which is sampled. FIG. 34 A and 34 F show an original pattern; 34 B and 34G the original pattern shifted to left; FIGS. 34C and 34H, the original pattern shifted to right; FIGS. 34D and 34 I, a pattern formed by the addition of the original patterns shifted to right and left; FIGS. 34E and 34 J, a binary-coded pattern of the addition pattern; and FIG. 34 K, a pattern generated by the addition of the patterns shown at FIGS. 34F, 34G and 34H. It is seen that the sum of any three adjacent picture elements is same with a picture element in FIG. 34 D which corresponds in position to the central picture element of three adjacent picture elements in FIG. 34 A.

Figure 35:
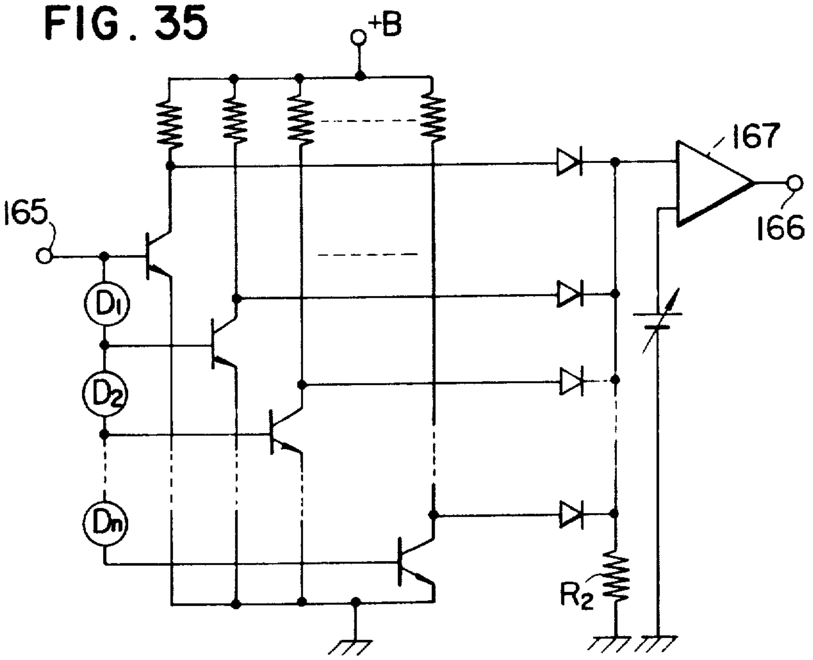

FIG. 35 shows a diagram of a circuit for processing serially, a one-dimensional continuous image. Reference numerals 165 and 166 denote input and output terminals respectively; and D1–Dn are delay lines. The output of an original pattern is applied to the input terminal 165 and to the delay lines D1–Dn. When the voltage across resistor $R_2$ becomes higher than a predetermined level, gate 167 is opened and the output is derived from the output terminal 166 for generating a pattern.

3. Small Portion Extracting Method

Opposed to the boundary spacing method, the enlargement-reduction method and the boundary averaging method described hereinbefore, the badspot extracting method does not require a boundary extracting circuit. Any of the micro-spot extracting circuits based upon the above three methods may be used as a micro-spot processing equipment, but they tend to detect the projections and notches on the boundary lines as defects. Therefore, these circuits must be used in combination with a boundary extracting circuit of the type described hereinbefore.

However, the processing equipment based upon the bad spot extracting method to be described in detail hereinafter may attain both the functions of the micro-spot extracting circuit and the boundary extracting circuit.

Referring back to FIG. 13, the hatched areas represent a copper foil on a printed circuit or chromium or emulsion on an IC mask. The bad spots 50 and 50' are included in the dark and bright areas. The projection 52 and the notch 53 are formed at the boundary lines due to the sampling of the pattern.

The equipment based upon the micro-spot extracting method has an advantage that only the bad spots 50' and 51' are extracted but the projection 52 and the notch 53 on the boundary lines are not detected and extracted.

Figure 36:
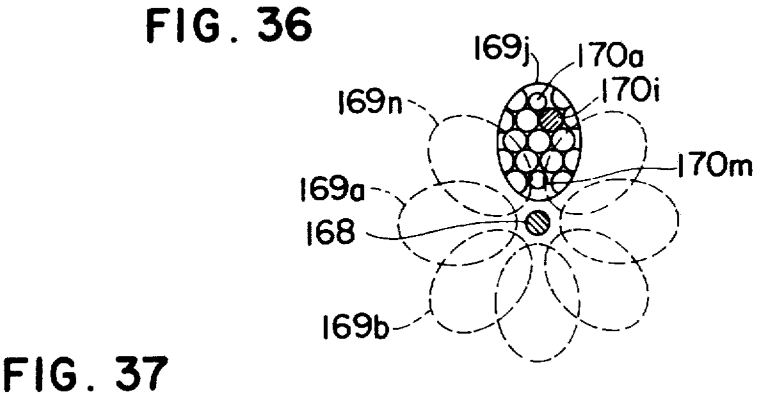
FIG. 36 is a view used for the explanation of the small portion extracting method.

Next referring to FIG. 36, a picture element 168 is selected and the regions 169*a*–169*n* surrounding completely the picture element 168 are investigated. The configuration and size of the surrounding regions 169*a* –169*n* are selected depending upon the complexity of an original pattern to be inspected. Preferably, the surrounding region is in the form of a segment, an egg, an ellipse or the like whose elongated portion is directed toward the selected picture element 168 and has a length less than one half of the width of a normal pattern.

Next, the method for determining whether the picture element 168 is a defect or a normal pattern will be described. It is assumed that the picture element 168 is in a logic state Po ( 1 or 0 ). The picture element 168 is detected as a part of a normal pattern when and only when all of the picture elements included in at least one surrounding region 169 are Po. In other words, when the logic function $$F_o = P_o \cap \bigcup_{j=1}^{m} \bigcap_{i=1}^{n} P_i^j \cup \overline{P_o} \cap \bigcup_{j=1}^{m} \bigcap_{i=1}^{n} \overline{P_i^j}$$

(where $P_1'$–$Pn'$ designate the logic states of the picture elements 170*a*–170*n* included in the surrounding region 169*j*) gives 1, the picture element 168 is identified as a part of a normal pattern. Therefore the logic function $$G_o = \overline{F_o} = (P_o \cup \bigcap_{j=1}^{m} \bigcup_{i=1}^{n} \overline{P_i^j}) \cap (\overline{P_o} \cup \bigcap_{j=1}^{m} \bigcup_{i=1}^{n} P_i^j)$$

gives 1 when the picture element 168 is a bad spot or defect. The logic function Go always gives 1 when at least one of the picture elements included in the surrounding region is not Po. Therefore, the logic function Go gives 1 when the bad spots 50 and 51 (See FIG. 13) are detected, but gives 0 for the projection 52 and the notch 53 on the boundary lines. Therefore, from the binary pattern shown in FIG. 13, including the bad spots, the pattern shown in FIG. 15 may be directly obtained. In FIG. 15, the micro-spots 50'' and 51'' correspond to the bad spots 50' and 51' in the pattern shown in FIG. 13. When the extracted bad spots and the background are displayed in different colors on a color display device, the sizes, types, positions and the like of the bad spots may be easily detected.

Figure 37:
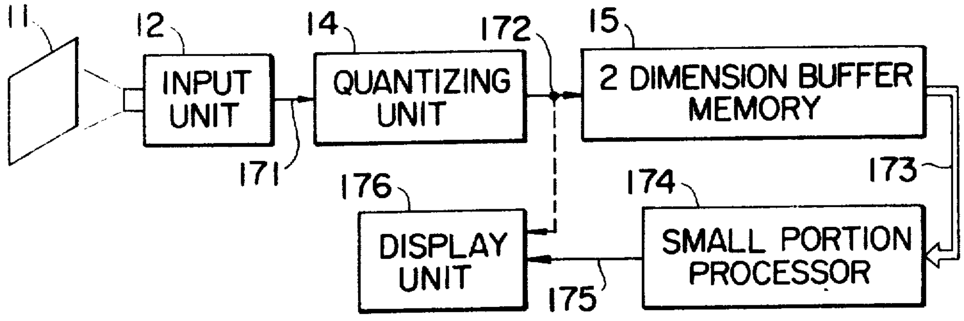
FIG. 37 is a block diagram of an inspection equipment similar to that shown in FIG. 1 except that a small portion processing device based upon the small portion extracting method is incorporated therein.

Next, the equipment based upon the above described principle of the micro-spot extracting method will be described with reference to a block diagram shown in FIG. 37. The optical image of a part 11 to be inspected such as a printed circuit or IC mask is converted into electrical signals by a photoelectric converter 12 such as a television camera. The video signal 171 from the camera 12 is converted into binary coded signals 172 by an analog-to-digital converter 14. A device 15 sequentially extracts the two-dimensional local video signal 173 from the binary coded and sampled video signal 172. A small portion processing device 174 is adapted to extract a bad spot from the local video signal 173, and an extracted bad spot signal 175 is displayed by a bad spot display device 176. The display device 176 may be a color display for displaying a bad spot in color, and if required, the background from the signal 172 as shown in FIG. 35.

Figure 38:
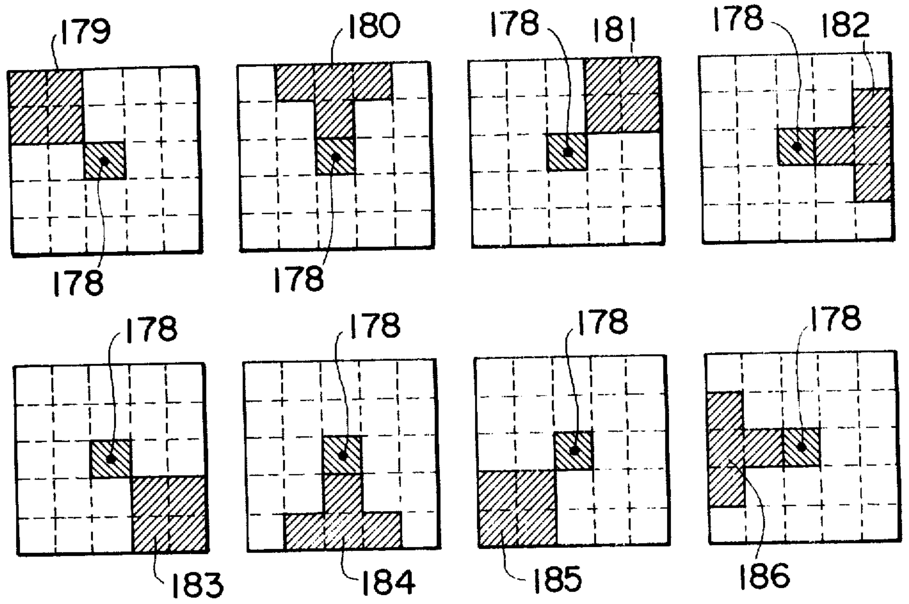
FIG. 38 shows logic patterns used for the explanation of the bad spot extracting method.

FIG. 38 shows some examples of the binary coded and sampled patterns which are to be processed according to the principle of the micro-spot extracting method described above. 178 is a central picture element, and 179–186 are the picture element regions which are subjected to the space logic processing in accordance with the present invention. Since the image is sampled, the regions are different in configuration depending upon the directions. The surrounding regions 179–186 must be so selected as to completely encircle the central picture element 178.

Figure 39:
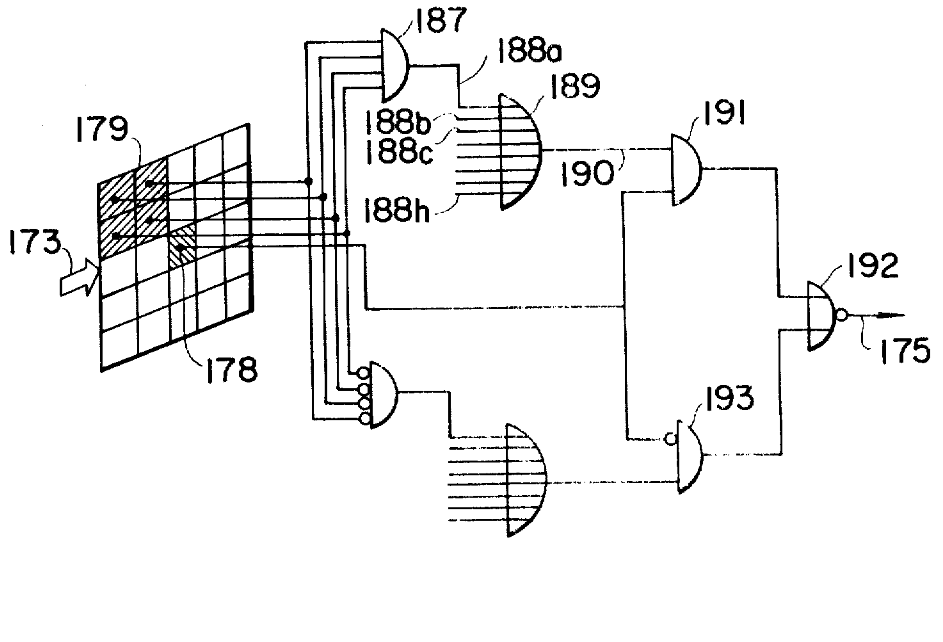

FIG. 39 shows a circuit for accomplishing the above logic function (1). An AND gate 187 provides an output 1 when all of four picture elements included in the region 179 of the two-dimensional local video signal 173 are 1. Similarly, when and only when all of the picture elements included in the surrounding regions 179–186 are 1, the outputs 1 188*b*–188*h* are derived. If all of the picture elements in any of the regions 179–186 are 1, the output of OR gate 189 becomes 1 and, if the central picture element 178 is 1, the output of AND gate 191 becomes also 1. Then, the central picture element 178 is detected as a part of a normal pattern, so that the output 175 of a NOR gate 183 becomes 0. Similarly, when the central picture element 178 is 0 and if all of the picture elements in any of the surrounding regions 179–186 are 0, the output of AND gate 193 becomes 1 so that the output 175 of the NOR gate 192 becomes 0. When any of the surrounding regions 179–186 includes a picture element opposite to the central picture element 178, the latter is detected as a part of a bad spot or defect and the NOR gate 192 gives the output 1.

As described hereinbefore, according to the present invention, the local video signals of a dark and bright pattern image are sequentially derived and a true bad spot included in the local videosignal is detected and extracted. Therefore, the projections or notches on the boundary lines may be prevented from being mistakingly detected or extracted as a defect, and the bad spots on the printed circuits or IC pellets having the complex patterns may be easily detected and extracted. Furthermore, only the bad spots or defects may be displayed on a display device, and an alarm device may be actuated when the number of bad spots reaches a predetermined number. Moreover, in response to the signal of the alarm device, a device for continuously or intermittently feeding parts to be inspected into the micro-spot or bad spot inspection equipment in accordance with the present invention may be temporarily stopped, and a part such as a printed circuit having a bad spot may be rejected automatically.

We claim:

1. Inspection equipment for detecting and extracting small portions in a pattern comprising:

a. input means for sequentially scanning a pattern to be inspected and converting said pattern into an electrical video signal;

b. means for sampling said video signal at a predetermined sampling time interval corresponding to one picture element of said pattern to be inspected and converting said video signal into a binary coded video signal;

c. a two-dimension image extracting means for rearranging the one-dimensionally arranged output from said sampling and binary coding means into a two-dimensionally arranged signal; and d. small portion processing means for extracting a desired video signal from said video signal stored in said two-dimensional image extracting means, thereby extracting a small portion from said pattern.

2. Inspection equipment as defined in claim 1 wherein said two-dimensional image extracting means (c) comprises:

i. first memory means, in which are connected in series, one or a plurality of elements for storing the pattern information per one scanning line obtained by said sequential scanning and for shifting said stored pattern information in response to the shift of the scanning point of said pattern information which is made in response to a sync signal in synchronism with a scanning signal, and ii. second memory means for storing the input information applied to the first element in said first memory means and the outputs of all of said elements in said first memory means and for shifting said stored information in response to said sync signal, so that the information stored in any of said elements may be derived arbitrarily.

3. Inspection equipment as defined in claim 1, wherein said means (b) for converting said video signal into a binary coded video signal comprises:

i. means for subtracting from said video signal a predetermined signal level;

ii. means for reducing the amplitude of the output from said subtracting means and for smoothing the reduced output;

iii. means for adding said predetermined signal level to the output of said reducing and smoothing means; and iv. means for converting said video signal into a binary coded video signal with the output of said adder means as a threshold.

4. Inspection equipment as defined in claim 3, wherein said small portion processing means (d) comprises:

i. a small portion extracting circuit for providing an output when the number of the binary coded signals representing one of the two states of a plurality of picture elements included in any of a plurality of continuous patterns passing through a predetermined picture element in a plurality of directions is less than a predetermined number;

ii. a boundary portion extracting circuit for providing an output when the binary signals representing the binary states of two local areas which are selected in a plurality of directions with an insensitive region, including said predetermined picture element being interposed between said two local areas, are different from each other; and iii. a comparator for receiving the outputs of said small portion extracting circuit and said boundary portion extracting circuit and for generating an output when and only when said boundary extracting circuit does not generate an output.

5. Inspection equipment as defined in claim 3, wherein said small portion processing means includes first processing means comprising:

i. means for compressing and then expanding the binary coded video signal in one state; and ii. means connected to said compressing and expanding means for expanding and then compressing said binary coded video signal in one state.

6. Inspection equipment as defined in claim 5, wherein said small portion processing means further includes:

second processing means for comparing an original pattern with a pattern which is obtained by said first processing means and in which a small portion is eliminated and extracting said small portion included in said original pattern.

7. An inspection apparatus for detecting and removing relatively small portions from a pattern comprising:

first means for scanning a pattern to be inspected and for generating a first video signal representative of the pattern scanned;

second means, connected to said first means, for sampling said video signal over a prescribed sampling time interval corresponding to an individual element of an image of the pattern and for encoding said video signal into a binary coded video signal;

third means, connected to said second means, for storing the output of said second means in n-dimensions, where n is an integer of at least two, so as to provide an n-dimensional encoded representation of said pattern and providing a second video signal corresponding to said n-dimensional representation; and fourth means, responsive to said stored n-dimensional representation of said pattern in said third means, for modifying a prescribed portion of said second video signal, to thereby effect the removal of a prescribed relatively small portion of said pattern.

8. An inspection apparatus according to claim 7, wherein said second means comprises:

means for providing a signal level corresponding to a predetermined threshold;

means, connected to said first means and said signal level providing means, for generating a difference signal representative of the difference between the level of said first video signal and the level of said threshold, means, responsive to the output of said difference signal generating means, for reducing and smoothing the output thereof, means, connected to the output of said reducing and smoothing means and the output of said signal level providing means, for adding the outputs thereof; and means, responsive to said first video signal and the output of said adding means, for generating a binary signal in accordance with the difference between said first video signal and the output of said adding means.

9. An inspection apparatus according to claim 7, wherein said fourth means comprises means, responsive to a predetermined number of segments of said n-dimensionally encoded representation, having a predetermined binary state, exceeding a preselected number, for generating and storing a further video signal representative of the states of said predetermined number of segments.

10. An inspection apparatus according to claim 7, wherein said fourth means comprises means, responsive to the portion of said second video signal, corresponding to each prescribed segment surrounding a preselected portion of said n-dimensionally encoded representative of said pattern, for generating a further video signal representative of whether at least one of said prescribed segments of said pattern has the same binary state.

11. An inspection apparatus according to claim 7, wherein said third means comprises an array of shift registers connected to the output of said second means for storing and sequentially shifting said sampled binary coded signal therethrough to said fourth means as said pattern is scanned by said first means.

12. An inspection apparatus according to claim 11, wherein said second means comprises an arrangement of analog storage elements connected to the output of said first means, means for sampling the contents of said analog storage elements, and a plurality of quantizing units connecting the outputs of said sampling means to a corresponding plurality of shift registers.

13. An inspection apparatus according to claim 11, wherein said second means comprises means for sampling and quantizing the output of said first means and gate means connected thereto for selectively gating the output of said second means to the shift registers of said array in accordance with the scanning of said first means.

14. An inspection apparatus according to claim 7, wherein said fourth means comprises small portion extraction means, responsive to said second video signal, for providing a signal representative of the existence of a prescribed portion of said pattern having a binary state different from that of a surrounding portion of said pattern, boundary extraction means, responsive to said second video signal, for providing a signal representative of the boundary of said pattern where the binary state of said pattern changes from one state to another, and comparing means, responsive to the outputs of said small portion extraction means and said boundary extraction means, for combining the outputs thereof with each other, so as to effect the removal from the said second video signal any component representative of a prescribed relatively small portion of said pattern.

15. An inspection apparatus according to claim 14, wherein said small portion extraction means and said boundary extraction means comprise respective prescribed logic circits connected to selected portions of said third means from which said second video signal corresponding to said n-dimensional encoded representation is provided.

16. An inspection apparatus according to claim 7, wherein said fourth means comprises:

first sequential means responsive to said second video signal, for effecting a sequential enlargement and reduction of the n-dimensional encoded representation of said pattern, second sequential means, responsive to said second video signal, for effecting a sequential reduction and enlargement of the n-dimensional encoded representation of said pattern;

means, responsive to said second video signal and said first and second sequential means, for combining said second video signal with each of said first and second sequential means, so as to effect the removal from said second video signal any component representative of a prescribed relatively small portion of said pattern.

17. An inspection apparatus according to claim 16, wherein each of said first and second sequential means comprises an array of OR gates, the inputs of which are connected to selected portions of said third means in which said n-dimensional encoded representation of said pattern is stored, a first array of storage elements connected to respective selected ones of said OR gates, an array of AND gates, the inputs of which are connected to selected ones of the storage elements of said first array, and a second array of storage elements connected to selected ones of said AND gates.

18. An inspection apparatus according to claim 17, wherein said combining means comprises a plurality of exclusive-OR gate networks connected to said selected portions of said third means and to the respective second arrays of storage elements in said first and second sequential means, a network of OR gates connected to respective exclusive OR gates of said plural exclusive OR gate networks and a third 84 a array of storage elements connected to the outputs of the OR gates of said network of OR gates.

* * * * *